United States Patent
Powell

(10) Patent No.: US 9,885,340 B2
(45) Date of Patent: Feb. 6, 2018

(54) AERODYNAMIC SCREEN SYSTEM

(71) Applicant: Patrick Kenneth Powell, Farmington Hills, MI (US)

(72) Inventor: Patrick Kenneth Powell, Farmington Hills, MI (US)

(*) Notice: Subject to any disclaimer, the term of this patent is extended or adjusted under 35 U.S.C. 154(b) by 277 days.

(21) Appl. No.: 14/606,004

(22) Filed: Jan. 26, 2015

(65) Prior Publication Data

US 2016/0215760 A1    Jul. 28, 2016

(51) Int. Cl.
| | |
|---|---|
| F03D 11/00 | (2006.01) |
| F03D 9/00 | (2016.01) |
| F03D 3/04 | (2006.01) |
| F03D 9/25 | (2016.01) |

(52) U.S. Cl.
CPC ............... *F03D 9/002* (2013.01); *F03D 3/04* (2013.01); *F03D 9/007* (2013.01); *F03D 9/25* (2016.05); *F05B 2220/25* (2013.01); *Y02E 10/74* (2013.01)

(58) Field of Classification Search
CPC . F03D 3/04; F03D 3/0427; F03D 9/41; F03D 1/02; F03D 1/025; F03D 1/04; F03D 3/02; F03D 3/03; F03D 3/0409; F03D 3/0418; F03D 3/0436; F03D 3/0445; F03D 3/0454; F03D 3/0463; F03D 3/0472; F03D 3/0481; F03D 3/049; F03D 9/00; F05B 2220/25

See application file for complete search history.

(56) References Cited

U.S. PATENT DOCUMENTS

| | | | |
|---|---|---|---|
| 4,075,500 A * | 2/1978 | Oman | F03D 1/04 290/55 |
| 6,918,456 B2 | 7/2005 | Dennison et al. | |
| 6,951,443 B1 * | 10/2005 | Blakemore | F03D 7/0224 415/155 |
| 7,215,037 B2 | 5/2007 | Scalzi | |
| 8,668,433 B2 * | 3/2014 | Friesth | F03D 1/025 290/55 |
| 2004/0005226 A1 | 1/2004 | Smith, III | |
| 2009/0110554 A1 | 4/2009 | Dukovic et al. | |

(Continued)

OTHER PUBLICATIONS

Tom Benson, Shape Effects on Drag, Apr. 9, 2004, [Retrieved Mar. 2, 2017].*

(Continued)

*Primary Examiner* — Craig Kim
*Assistant Examiner* — Jason Fountain
(74) *Attorney, Agent, or Firm* — Carlson, Gaskey & Olds, P.C.

(57) ABSTRACT

A screened wind power generation system for generating power in locations where the sight of wind turbines is undesirable or where advertising space can be utilized. The system uses a screen to cover wind turbines with a mesh size and other characteristics that are appropriate for allowing sufficient wind to pass through to wind turbines. The mesh can be coated or imprinted with surface indicia that constitute advertising or create an appearance that blends with surroundings better than an unscreened wind power generation system. The depth of the screen can vary to better enable muffling of wind turbine noise. The screen cross-section can have an aerodynamic shape to facilitate wind flow through the screen.

23 Claims, 26 Drawing Sheets

(56) References Cited

U.S. PATENT DOCUMENTS

| | | | | |
|---|---|---|---|---|
| 2011/0027067 A1* | 2/2011 | Kennedy, III | ............ | F03D 1/04 |
| | | | | 415/4.1 |
| 2011/0197578 A1* | 8/2011 | Leijon | .................. | F03B 17/063 |
| | | | | 60/497 |
| 2011/0310596 A1* | 12/2011 | Ahmadi | .................. | F21S 9/043 |
| | | | | 362/183 |
| 2015/0098795 A1 | 4/2015 | Gonzalez | | |

OTHER PUBLICATIONS

International Preliminary Report on Patentability for International Application No. PCT/US2016/014680 dated Aug. 10, 2017.

* cited by examiner

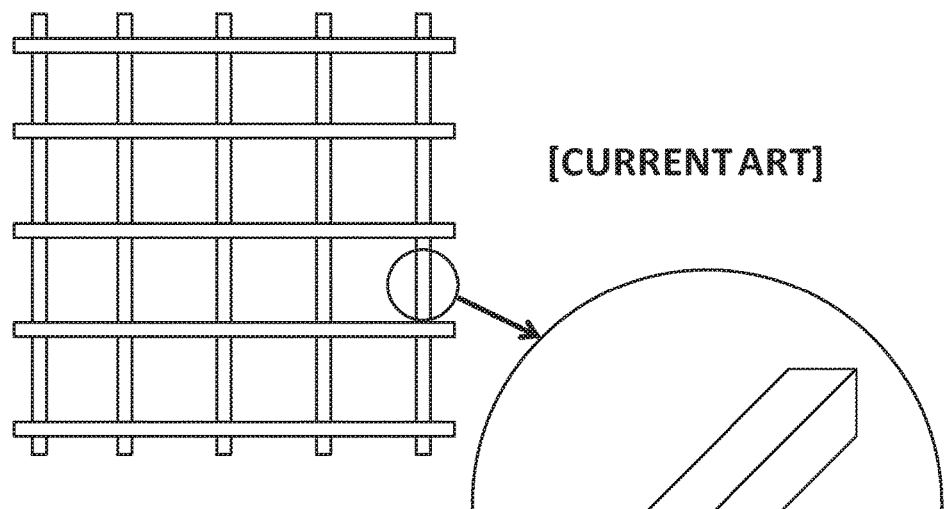
FIG. 6 [CURRENT ART]
600
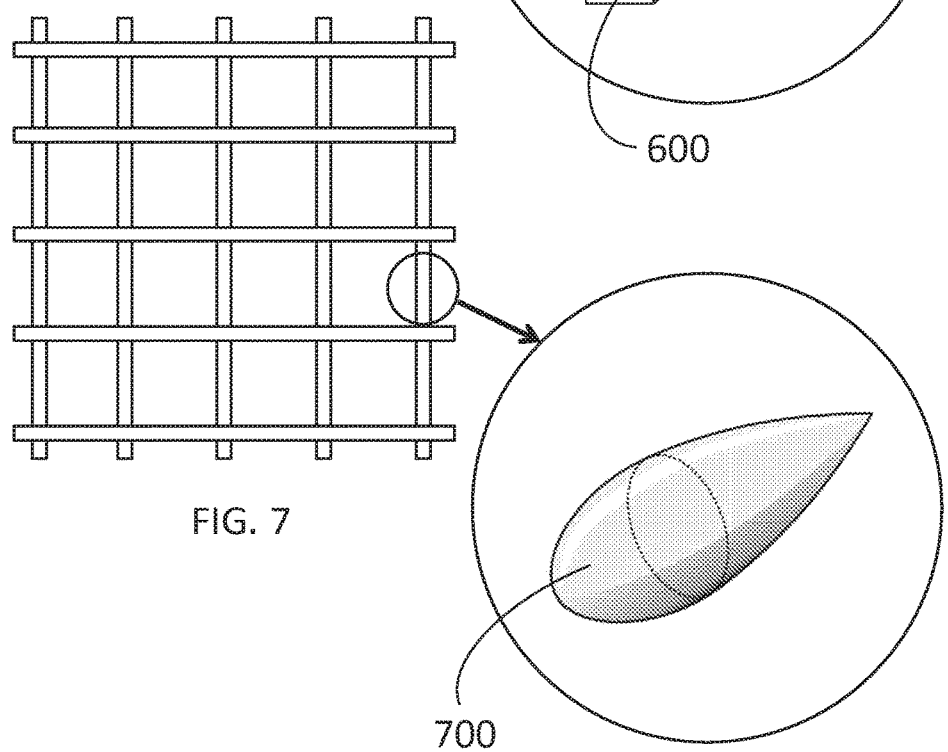
FIG. 7
700

|   | SCREEN SHAPE | FLOW DIRECTION | CROSS-SECTION | DRAG COEFFICIENT |
|---|---|---|---|---|
|   | CUBE | ⇒ | □ | ~ 1.05 |
|   | DIAMOND | ⇒ | ◇ | ~ 0.80 |
|   | CONE | ⇒ | ◁ | ~ 0.50 |
|   | SPHERE | ⇒ | ○ | ~ 0.47 |
|   | HALF-SPHERE | ⇒ | ◐ | ~ 0.42 |
| A | AERO | ⇒ |   | ~ 0.15 |
| B | AERO | ⇒ |   | ~ 0.04 |
| C | AERO + SOUND ABSORBER | ⇒ |   | ~ 0.04 |
| D | AERO + RESONANCE TUBE | ⇒ |   | ~ 0.04 |
| E | AERO + RESONANCE POCKET | ⇒ |   | ~ 0.04 – 0.25 |
| F | AERO + LEADING EDGE | ⇒ |   | ~ 0.04 |
| G | AERO + FLAT TAIL TIP | ⇒ |   | ~ 0.04 |

FIG. 7A

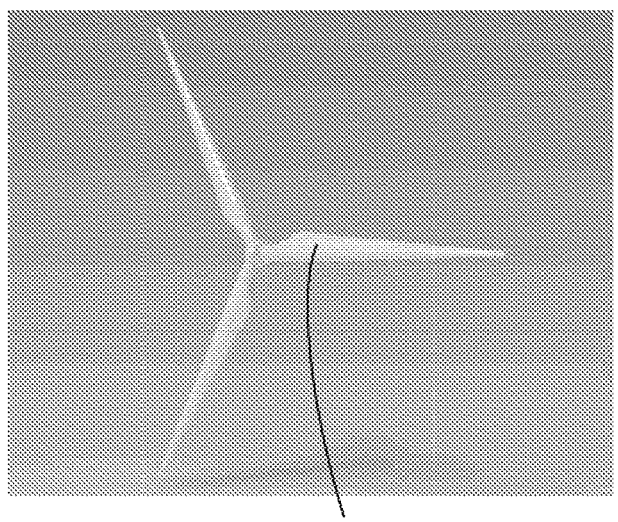
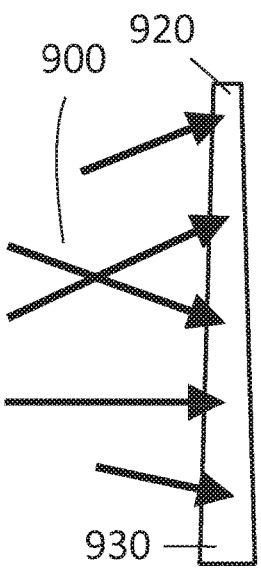
FIG. 9A  910  FIG. 9B
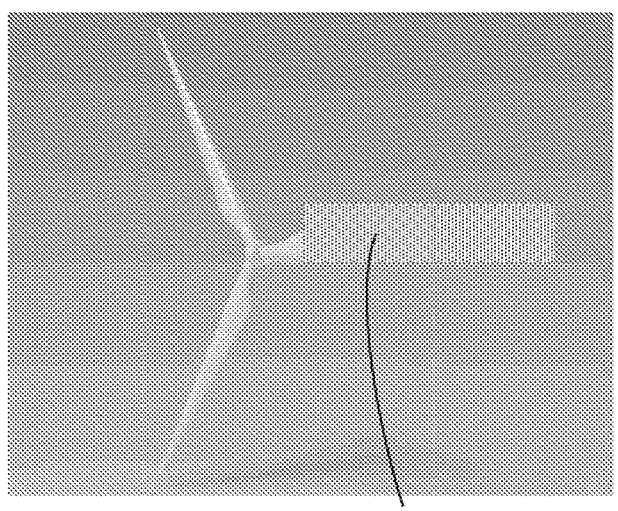
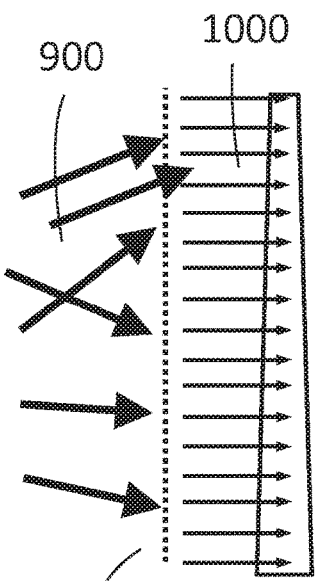
FIG. 10A  1010  1010  FIG. 10B

AERODYNAMIC SCREEN SYSTEM

TECHNICAL FIELD

This disclosure is related to wind power generation systems. More particularly, the disclosure discusses screened systems configured to hide, protect, and improve elements of the generation system and provide aesthetic or commercial benefits.

BACKGROUND

The statements in this section merely provide background information related to the present disclosure. Accordingly, such statements are not intended to constitute an admission of prior art.

Many current wind generation systems are not considered aesthetically and acoustically pleasing. Hence, property owners near the wind generation system are adversely affected by reduced property values. Further, wind generation systems are unprotected against the elements. Hence, wind turbine operators are adversely affected by costly damage from lightning, bird strikes, or other forces of man and nature. Further, wind generation systems are often powered by a plurality of non-optimal wind vectors. Hence, output of the system is reduced.

BRIEF SUMMARY OF THE INVENTION

In one embodiment, the apparatus for generating wind power comprises: one or more wind turbine(s); a screen covering the wind turbines, the screen comprising: a plurality screen openings, wherein the screen openings are a consistent shape; and a plurality of screen sides, wherein each screen side partially borders at least one screen opening, further wherein each screen side has a rounded edge facing a wind direction and a trailing edge.

In a separate embodiment, there is a predetermined distance between the rounded edge and the trailing edge of each screen side and the predetermined distance varies in relation to an acoustic signature emanating from various points on the wind turbine.

In a separate embodiment, the trailing edge is comprised of a sound absorbing material and the sound absorbing material properties vary in relation to an acoustic signature emanating from various points on the wind turbine and striking the screen.

In a separate embodiment, the trailing edge includes a resonance tube configured to dampen an acoustic signature emanating from various points on the wind turbine and striking the screen.

In a separate embodiment, the rounded edging facing a wind direction includes a sharp edge useful for creating a split in wind flow as it enters the screen.

In a separate embodiment, the rounded edge faces downwind while the trailing edge faces the wind direction.

In a separate embodiment, the trailing edge includes an abnormal concave shape useful for modifying the acoustic signature passing through the screen emanating from various points on the wind turbine.

In a separate embodiment, the screen sides contain a plurality of forward facing photo voltaic cells producing electricity from light.

In a separate embodiment, the apparatus further comprises a wind redirection device placed behind the wind turbine(s).

In a separate embodiment, the screen is attached to a roof pitch of a structure and the structure comprises a ducting configured to channel airflow between the roof pitch and a second roof pitch, further wherein the ducting is configured to enable a water runoff.

In separate embodiments, the apparatus can further comprise: a vertical structure upon which the screen is mounted, the structure being configured to rotate in response to a wind direction; light emitting devices(s) mounted upon the screen sides; a coating applied to the screen sides, wherein the coating presents an image when viewed at a predetermined distance; a coating applied to the screen sides, whereas the coating reduces the coefficient of friction between the wind and the screen; a connection to a power distribution grid; a battery configured to temporarily store power; an inverter configured to harmonize an AC output power with an electrical grid; a device configured to start or stop an output power emanating from the apparatus; and/or a ground rod attached to the screen, the ground rod being configured to provide protection from a lighting strike; a processing circuit configured to operate the apparatus; a convertor configured to modify AC into DC power; a convertor configured to modify DC into AC power.

In a separate embodiment, the apparatus is configured with a radio, wherein the radio can receive and transmit data.

In a separate embodiment, the apparatus is configured with a wind direction sensor.

In a separate embodiment, the apparatus is configured with a wind speed sensor.

In a separate embodiment, the apparatus provides power to a local structure.

In a separate embodiment, the power is transmitted from the apparatus through a wireless transfer device.

In a separate embodiment, the apparatus was manufactured using an additive manufacturing process.

In a separate embodiment, the screen is broken into sections.

In a separate embodiment, the screen sections are mounted to the structure using vibration isolator joints, whereas the joints are comprised of an elastomeric compound useful for the dampening of vibrations.

In a separate embodiment, the turbine blades comprise unequal lengths.

In a separate embodiment, the turbine blades are spaced at unequal angles from one another.

In a separate embodiment, the wind turbine apparatus is shaded black, whereas the black shading absorbs light significantly reducing the dynamic aspect of movement visualized through the covering screen.

In a separate embodiment, a reducing funnel configured to increase wind velocity is placed between the screen apparatus and the wind turbine.

In a separate embodiment, a reducing funnel configured to increase wind velocity is placed before the screen apparatus and the wind turbine.

In separate embodiments, the apparatus is located on the side of a structure, wherein a wind redirection device is configured behind the wind turbine to ensure continuity of flow; a flow valve configured to prevent ingression of foreign debris is placed on the outlet point(s) of the redirection device; a wireless power transmission device is configured to transfer power from the apparatus into the nearby structure; the apparatus includes blades connected via a race configured to power a motor-generator located off-center from the spinning axis, whereas the configuration allows service of the motor-generator where access to the spinning axis is limited.

In a separate embodiment, the apparatus includes screens placed over both the upwind and downwind faces of the wind turbine(s).

In a separate embodiment, the screen sides include a plurality of surface imperfections configured to break-up surface flow laminations.

In a separate embodiment, turbine blades are divided into two or more nearly equal sections configured to allow air to pass thru.

In a separate embodiment, the windscreen is configured to be substantially round with a horizontal axis wind turbine configured to rotate inside.

In a separate embodiment, the windscreen is configured to be substantially round with a vertical axis wind turbine located inside.

In a separate embodiment, the apparatus is configured such that the screen shape matches a nearby manmade structure or act of nature.

In a separate embodiment, the apparatus is configured such that the screen is painted to look like a flag.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly:

FIG. 6 shows an embodiment of a non-aerodynamic windscreen mesh.

FIG. 7 shows an embodiment of an aerodynamic windscreen mesh.

FIG. 7A defines various shape embodiments A, B, C, D, E and F, G of the aerodynamic windscreen mesh.

FIG. 9A is a perspective view of a three-blade rotor.

FIG. 9B is a side view of a three-blade rotor.

FIG. 10A is a perspective view of a three-blade rotor with a partial view of a cover screen.

FIG. 10B is a side view of a three-blade rotor with a partial view of a cover screen.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Since wind turbines are not always considered aesthetically and acoustically pleasing, there is public opposition to wind turbine installations in certain locations. The present disclosure discusses a novel system to visually hide a wind turbine installation, provide an aesthetically pleasing view, mitigate unpleasant acoustic output, and/or provide advertising. Further, wind turbines are considered inefficient in certain circumstances where variability in wind vectors disrupt the performance of the wind turbine by striking the system in a non-uniform manner. The present disclosure discuses a novel system to mitigate the effects of wind vector variation. Further, wind turbines are left unprotected from man-made and act of nature. The present disclosure discusses a novel system to protect wind turbines from damage.

The system uses a screen to cover wind turbines. The screen allows airflow to the wind turbines, but when viewed at a distance can appear to be an advertising billboard or a picture of a natural setting. Airflow losses through the screen can be mitigated by using a screen with airfoil characteristics. Screen shape and material can also vary in different portions of the screen to mute the sound of the wind turbines and generators by matching resonant frequency characteristics of the turbines and generators.

Figure 1:
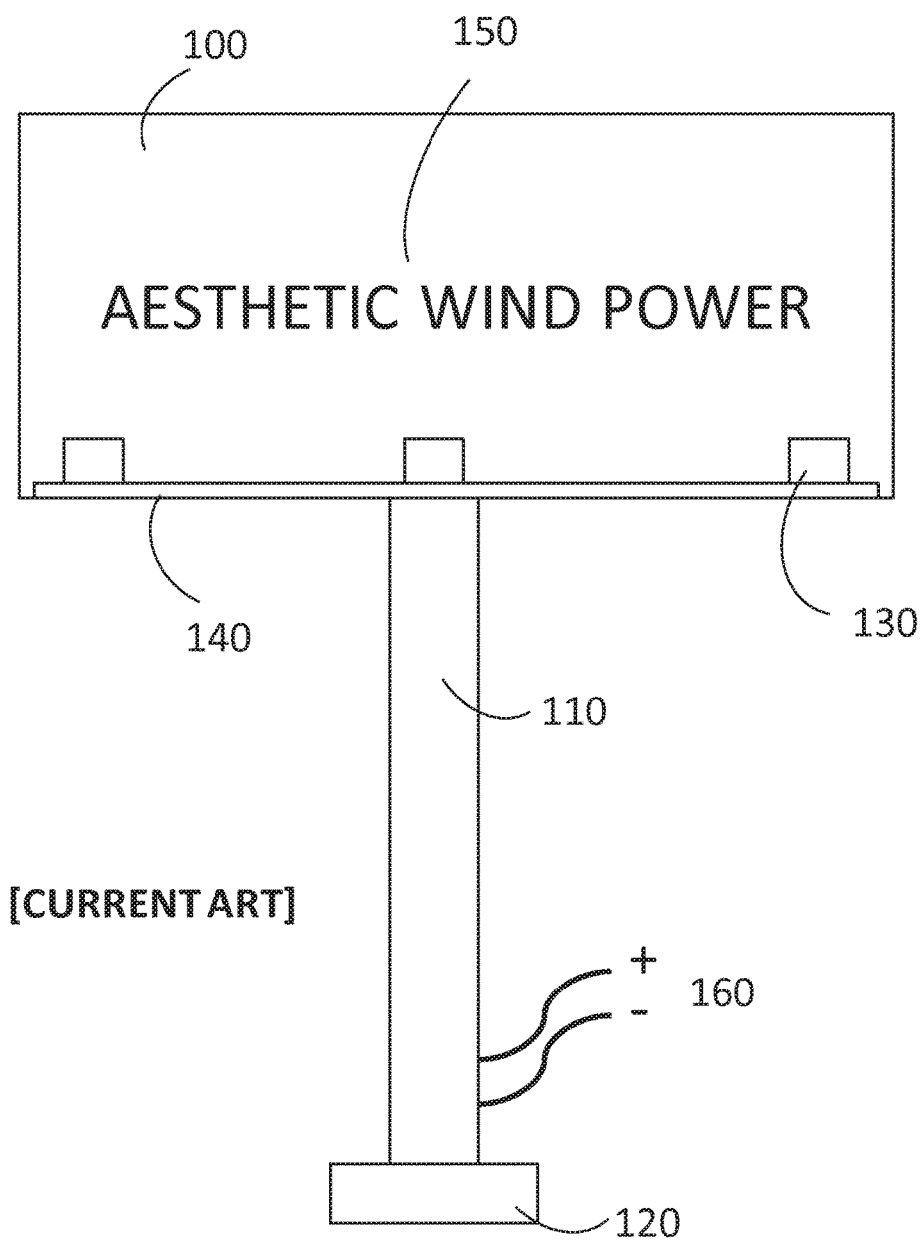
FIG. 1 is an advertising billboard.

FIG. 1 is an advertising billboard. Shown are the billboard face 100, billboard support structure 110, billboard base support 120, billboard illumination lights 130, billboard maintenance walkway 140, billboard advertisement 150, and power 160 supplied from the grid.

Figure 2:
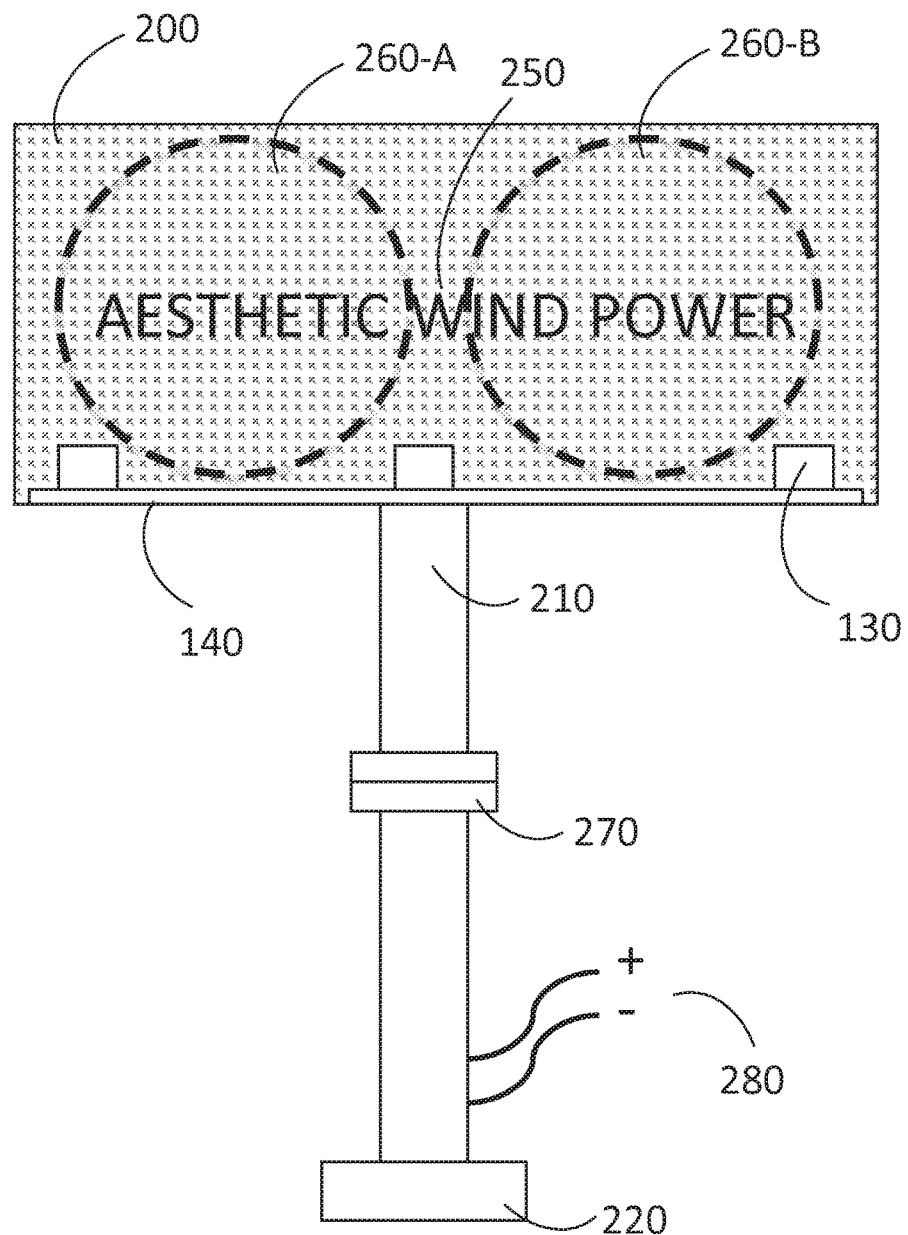
FIG. 2 shows an apparatus embodiment with a screen and wind turbines.

FIG. 2 shows an apparatus embodiment with a screen and wind turbines. Shown are billboard face consisting of pass thru air screen 200, billboard support structure 210 above rotatable portion 270, billboard base and support 220 below the rotatable portion 270, billboard advertising applied to the pass thru air screen 250, one power generating wind turbine 260A placed behind the screen, one power generating wind turbine 260B placed behind the screen, rotatable portion 270 capable of directing to portion into the wind direction, power 280 supplied or taken from the grid.

Figure 3:
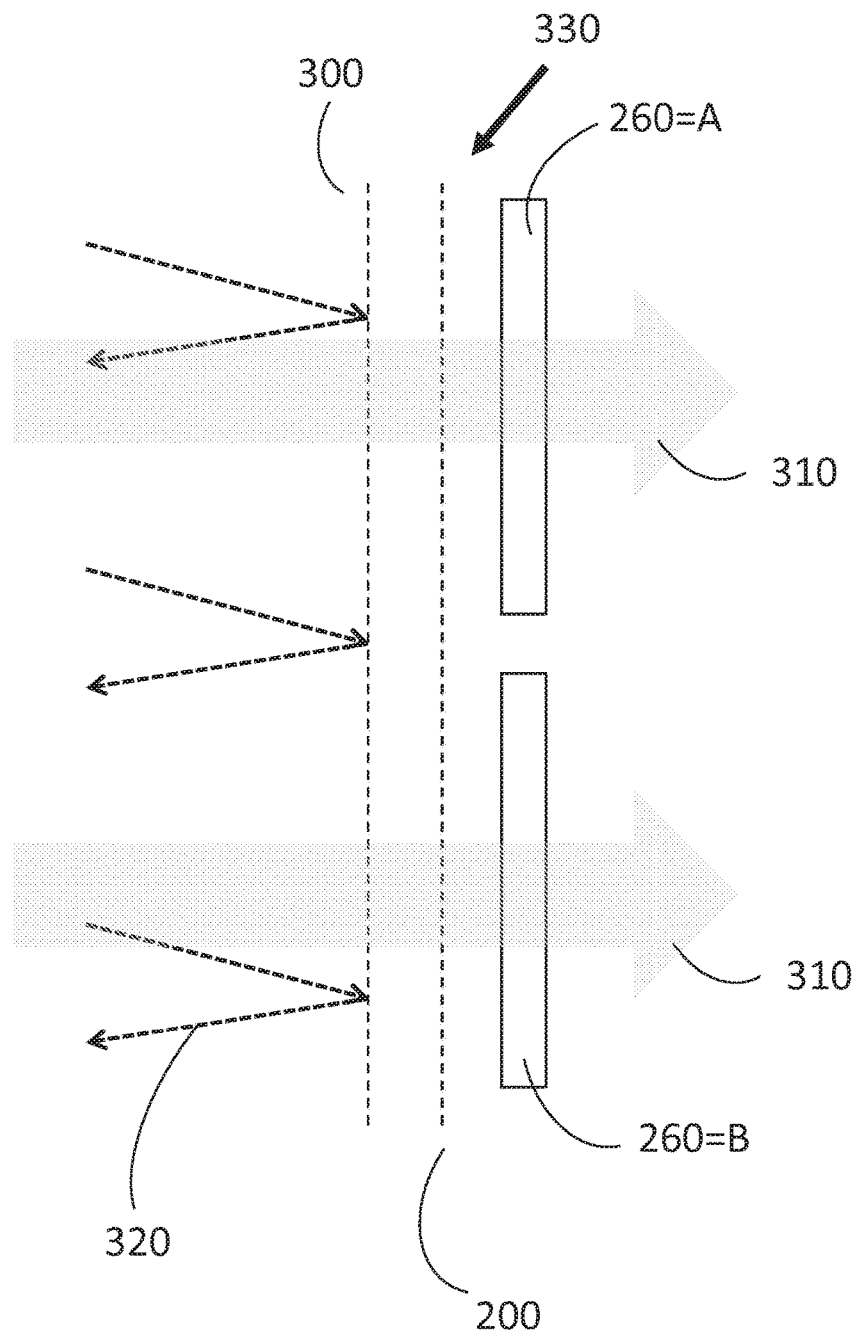
FIG. 3 shows a top view of airflow and apparatus elements.

FIG. 3 shows a top view of airflow and apparatus elements. Shown are coating 300 such as paint or plastic applied to the outward view of the screen 200, wind 310 flowing through the assembly, and light photons 320 reflecting off the outer surface of the coating 300 and screen 200.

Figure 4:
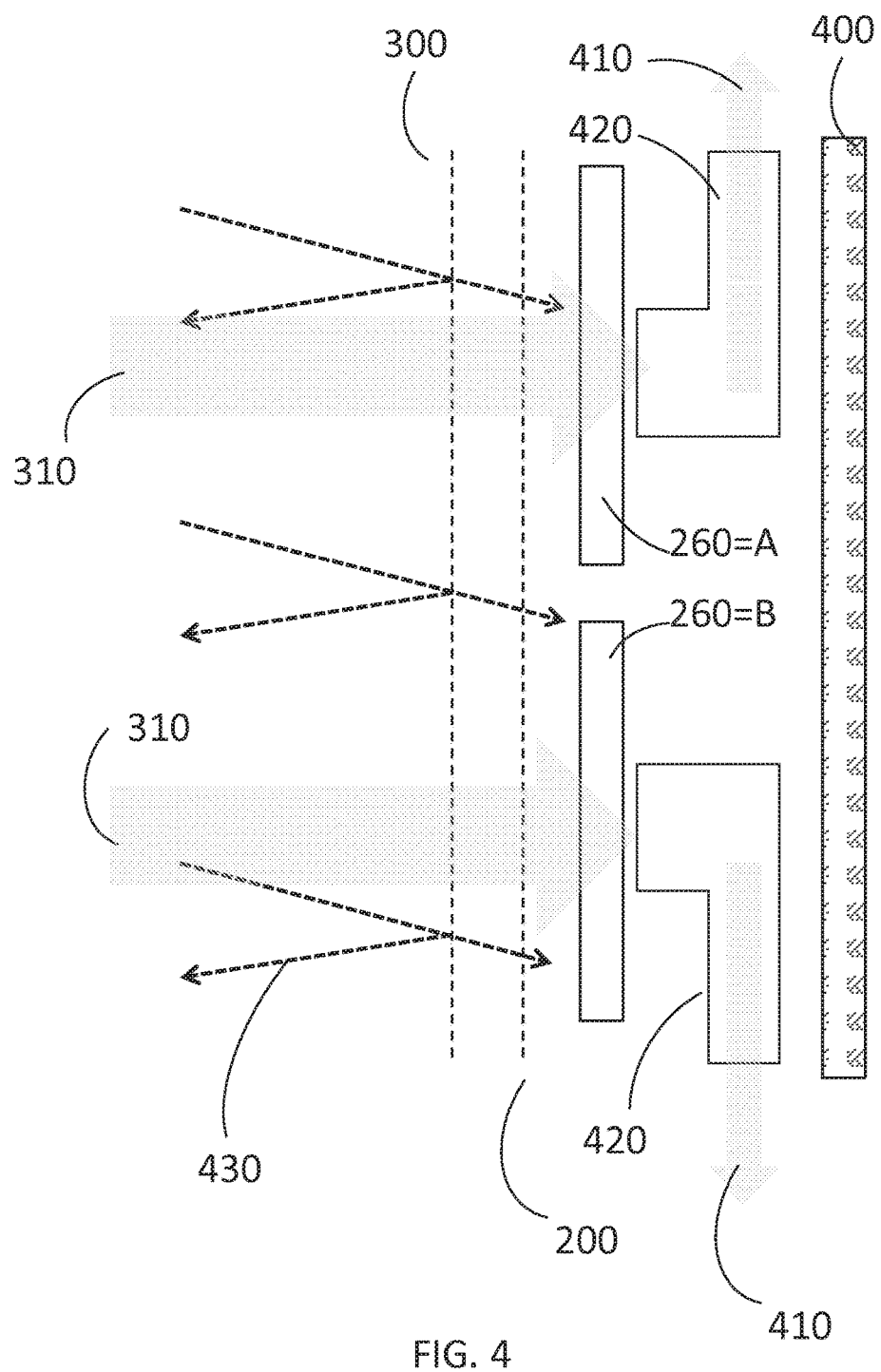
FIG. 4 shows a top view of airflow and additional apparatus elements.

FIG. 4 shows a top view of airflow and additional apparatus elements. Shown are solid object 400 blocking the flow of wind and light, continuum of airflow 410 directed away from the solid object 400, ducting system 420 directing air away from the solid object 400, and light photons 430 partially reflecting and partially passing thru the screen 200.

Figure 5:
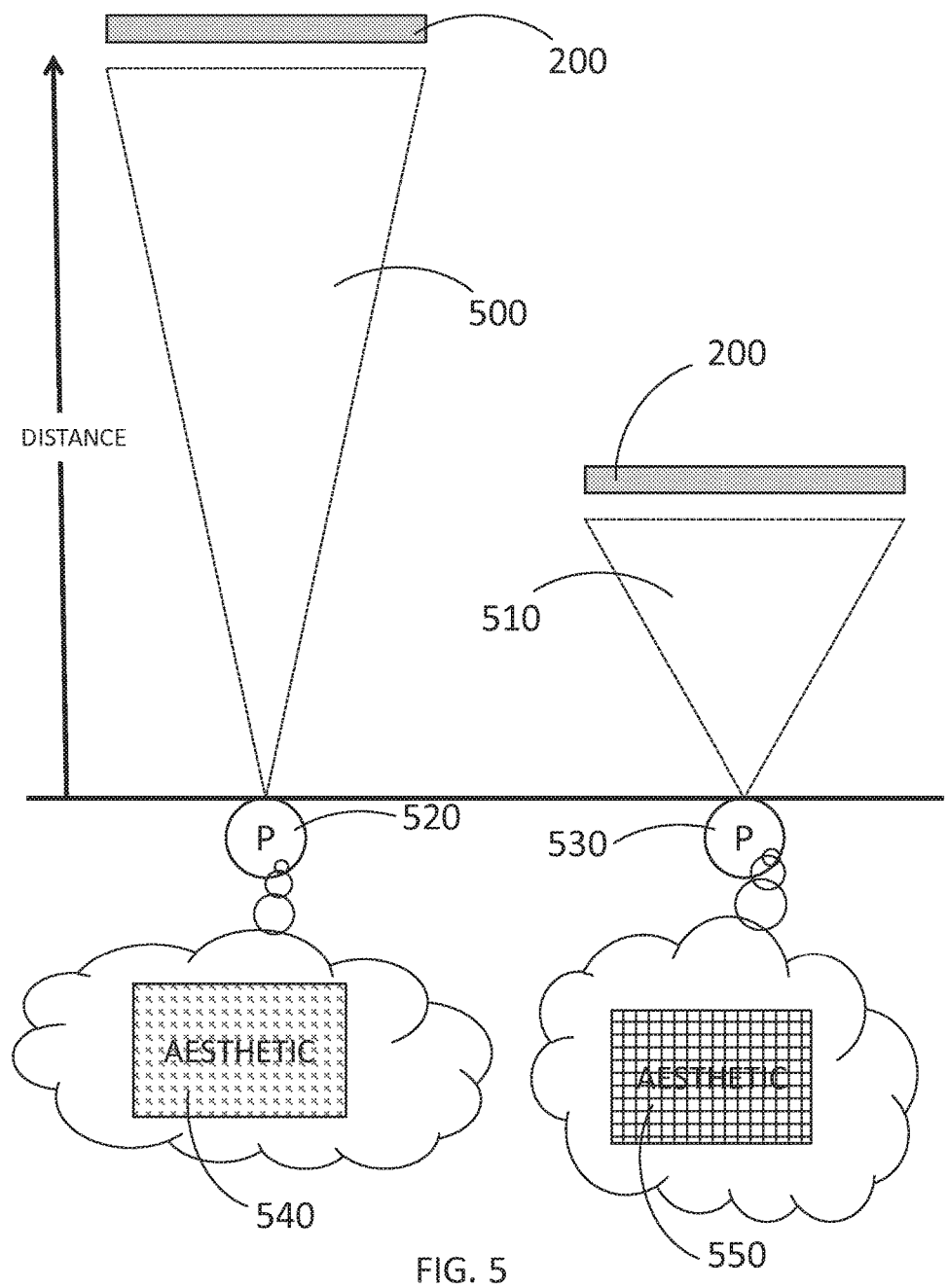
FIG. 5 gives a visual depiction of screen mesh density from a distance.

FIG. 5 gives a visual depiction of object detection through a screen mesh. Shown are field of view of a first person 500 looking at the screen 200 covered turbine, field of view of a second person 510 standing closer to the same screen 200 covered turbine, first person 520 standing far away from the screen 200 covered turbine, second person 530 standing much closer to the wind covered turbine, first person visual perception 540 regarding mesh density, and second person visual perception 550 regarding mesh density.

FIG. 6 shows an embodiment of a non-aerodynamic windscreen mesh. Shown is a square wind screen mesh 600.

FIG. 7 shows an embodiment of an aerodynamic windscreen mesh. Shown is an aerodynamic windscreen mesh 610 characterized by a round front edge face followed by a tapered tail edge.

FIG. 7A defines various shape embodiments A, B, C, D, E and F, G of the aerodynamic windscreen mesh.

Figure 8:
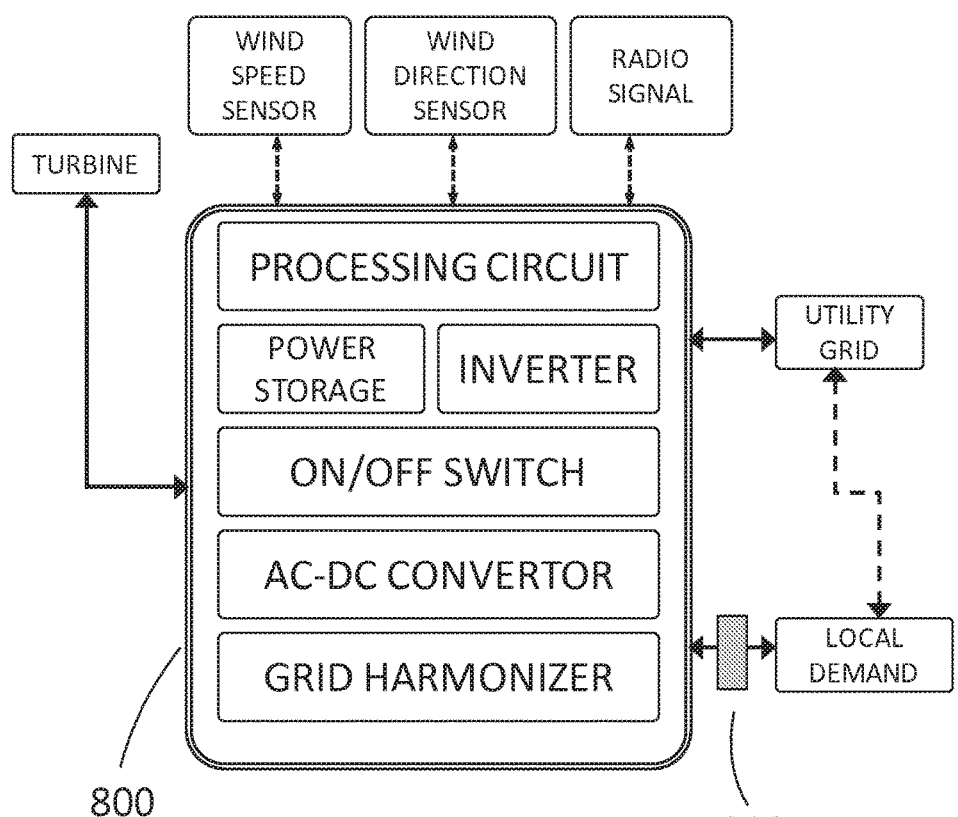
FIG. 8 shows an embodiment of electrical control unit.

FIG. 8 is a schematic view of the control management system 800 of the apparatus including a processing circuit, a power storage device, an on-off switch, a conversion device between AC and DC voltages, a device for harmonizing output waveform to the grid, a radio system for receiving and transmitting information, an input for wind speed, an input for wind direction, power in and out to the grid, power in and out to the local electrical demand, and a device for transferring this power wirelessly between the apparatus 810 and the local demand.

FIG. 9A is a perspective view of a three-blade rotor. Shown is a wind turbine blade 910 that is narrower at the blade tip 920 than the blade base 930.

FIG. 9B is a side view of a three-blade rotor. Shown are multiple wind vectors 900 the blade tip 920, and blade base 930.

FIG. 10A is a perspective view of a three-blade rotor with a partial view (for illustrative purposes only) of a cover screen. Shown is a wind turbine blade 910 that is narrower at the blade tip 920 than the blade base 930 and a screen 1010.

FIG. 10B is a side view of a three-blade rotor with a cover screen. Shown are multiple wind vectors 900 the blade tip 920, blade base 930, screen 1010, and redirected wind vectors 1000. The post screen airflow applies more evenly to the blade.

Figure 11:
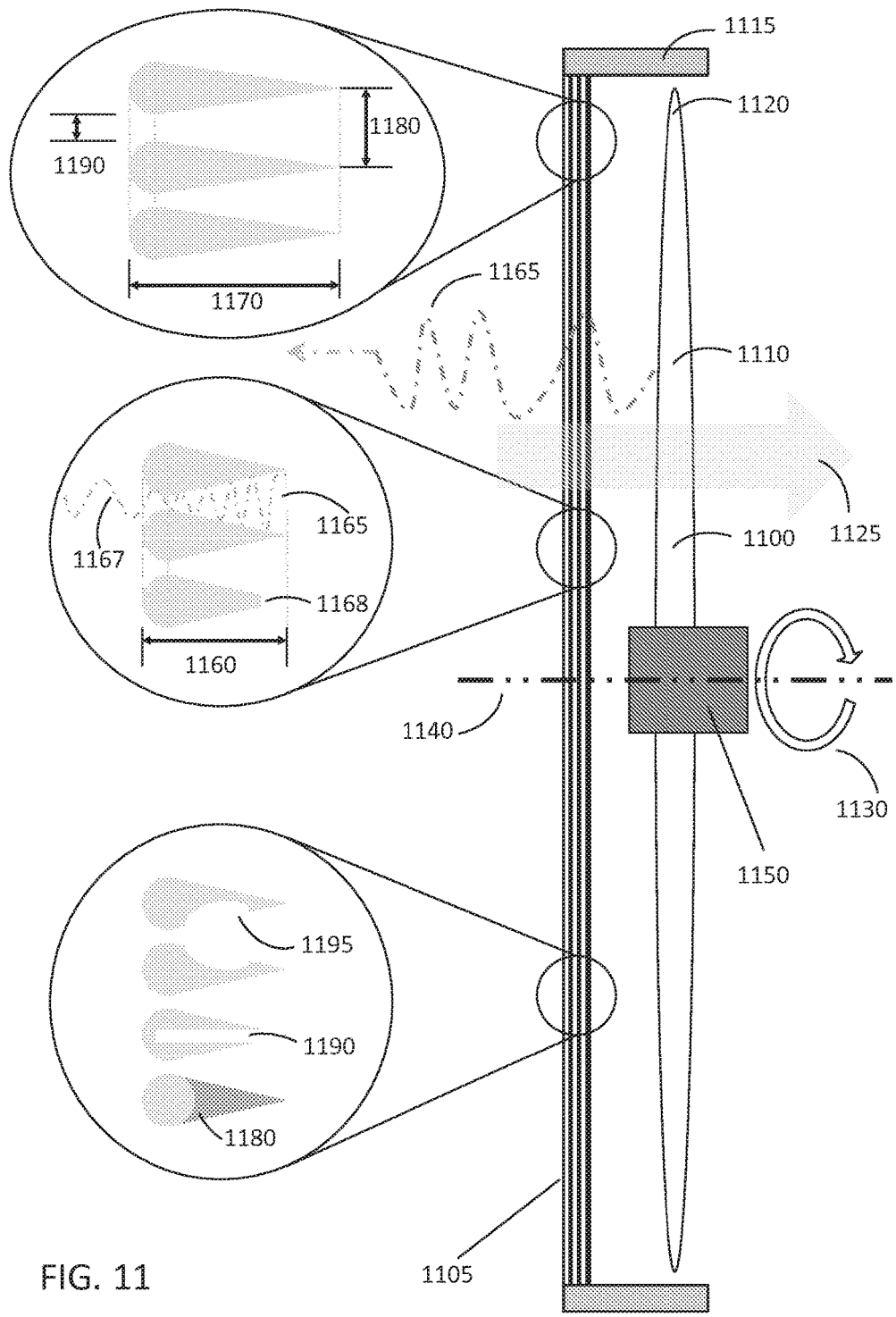
FIG. 11 shows an embodiment with acoustic variation in the windscreen mesh.

FIG. 11 is a side view of a wind-turbine with a cover screen. A wind flow 1125 is shown along with an acoustic signature 1165 generated by the wind turbine near point 1110 on the turbine blade. Shown is a screen configuration at a depth 1170 with an inlet size 1190 and outlet size 1180 matched to acoustically mitigate the noise emanating from 1120 on the turbine blade. Inner point 1100, middle point 1110, and outer point 1120 along a blade of the wind turbine spin at the same angular speed but travel separate distances along a radial circumference thereby creating different acoustic signatures. Differences in blade width and angle of attack also contribute to variation in acoustic signature from point to point along the turbine blade. Variations in screen media depth as demonstrated by 1160, variations in screen media inlet size as shown by 1167, and variations in screen media outlet size as shown by 1165 are configured separately for variations of acoustic signature along the blade length. Additional variations of screen design are also demonstrated by acoustic resonance cavity 1195, a resonance tube as shown by 1190, a flat tail tip as shown by 1168, and the addition of noise absorbing material as shown by 1180 and 1115. A motor-generator is shown as 1150 spinning along an axis 1140.

Figure 12:
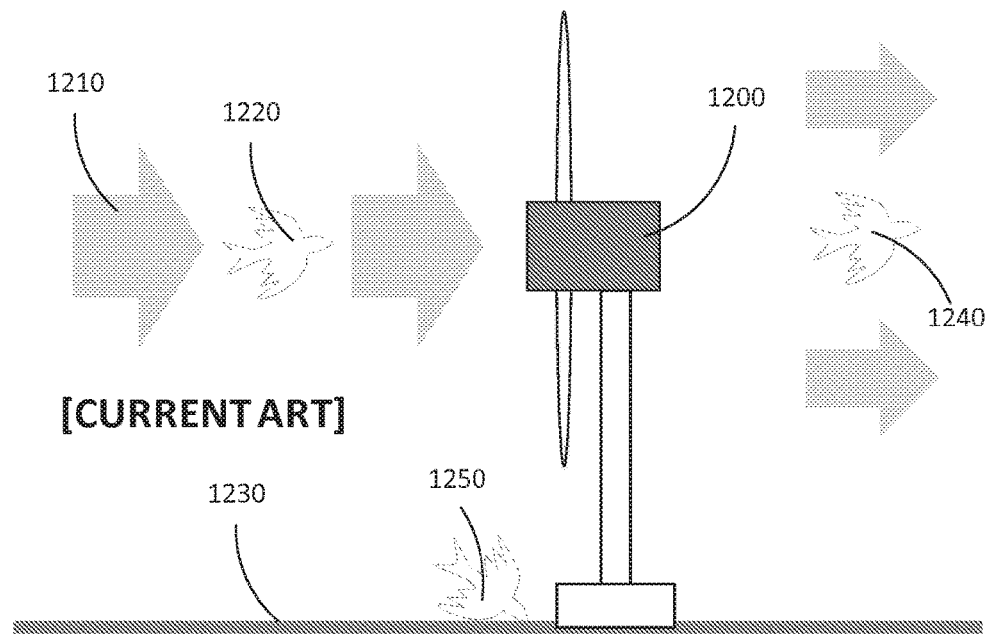
FIG. 12 shows the impact of prior art on wildlife.

FIG. 12 shows the impact of prior art on wildlife. Shown are a wind power turbine assembly 1200, wind 1210 approaching the wind turbine assembly 1200, wildlife 1220 flying in the path of the wind 1210, the surface 2130 upon on which the wind power turbine assembly 1200 stands, unaffected wildlife 2140 passing through the wind blades (untouched and alive), and affected wildlife 1250 struck by the spinning blades (touched, dead, or wounded).

Figure 13:
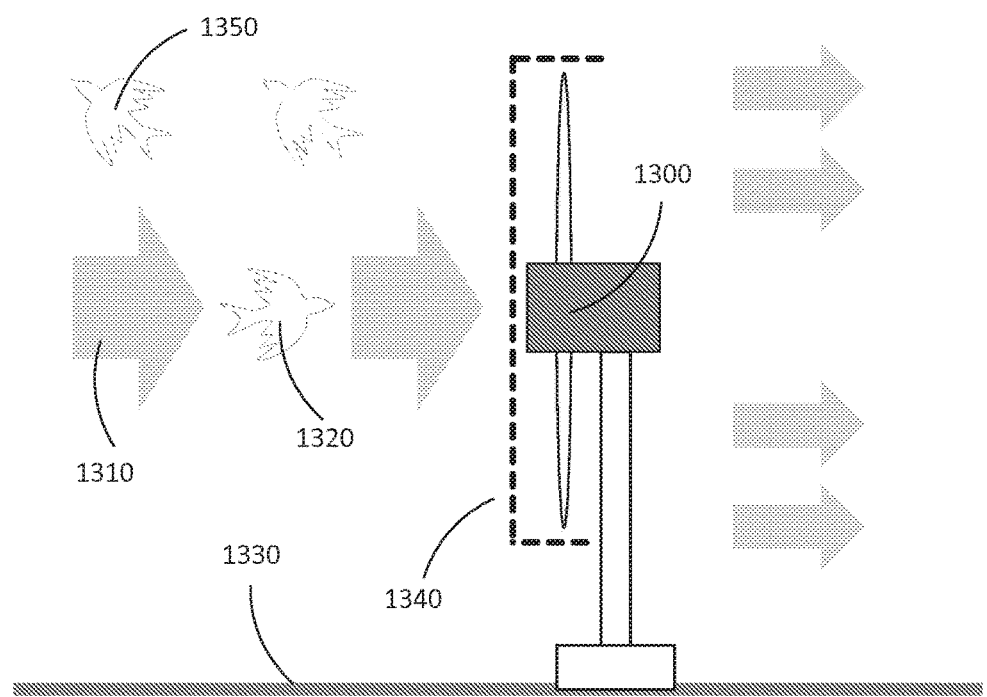
FIG. 13 shows the impact of an embodiment on wildlife.

FIG. 13 shows the impact of an embodiment on wildlife. Shown are screen impacted wildlife 1350 who come into proximity with the protective screen 1340 and survive, protective screen 1340 covering the wind turbine assembly 1300 prevents intrusion, wind 1310, wildlife 1320, and a surface 1330.

Figure 14:
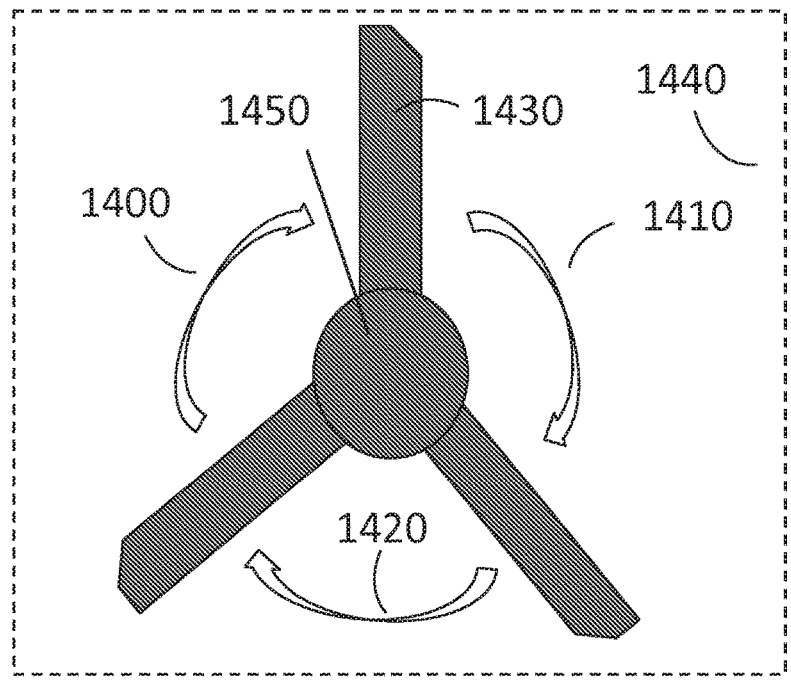
FIG. 14 shows an embodiment with rotor blades of unequal spacing.

FIG. 14 shows an embodiment with wind turbine 1450 covered by protective screen 1440 whose rotor blades are spaced with at least one angular distance 1400, 1410, and 1420 being of unequal degrees and made of a light weight material such as plastic, aluminum, or steel. The unequal degrees being configured to space apart the acoustic overlap of blade tip acoustic frequency. The impact of foreign objects on prior art necessitates the construction of impact resistant blades whose weight might limit the use of blades spinning at unequal angles to one another, as they would create overstress on the wind turbine axis. A further variation of the apparatus includes a dark colored wind turbine 1430 to minimize near field of vision of the wind turbine at night.

Figure 15:
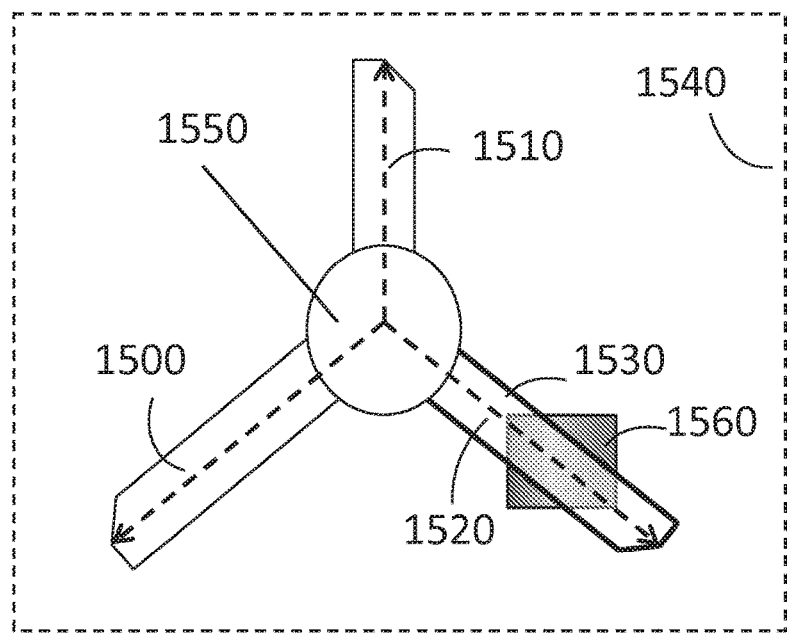
FIG. 15 shows an embodiment with rotor blades of unequal length.

FIG. 15 shows an embodiment with wind turbine 1550 covered by a protective screen 1540 whose rotor blades 1500, 1510, and 1520 contain at least one blade of unequal length to the others and constructed of a light weight material such as plastic, aluminum, or steel. The unequal degrees being configured to create an unequal acoustic signature improving the noise emanating from the apparatus. The impact of foreign objects on prior art necessitates the construction of impact resistant blades whose weight might limit the use of blades of unequal mass, as they would create overstress on the wind turbine axis. A further embodiment of the apparatus includes a translucent portion 1530 of a blade, useful for the placement of solar panels 1560 behind the screen and turbine, acting as a second source of power for the apparatus.

Figure 16:
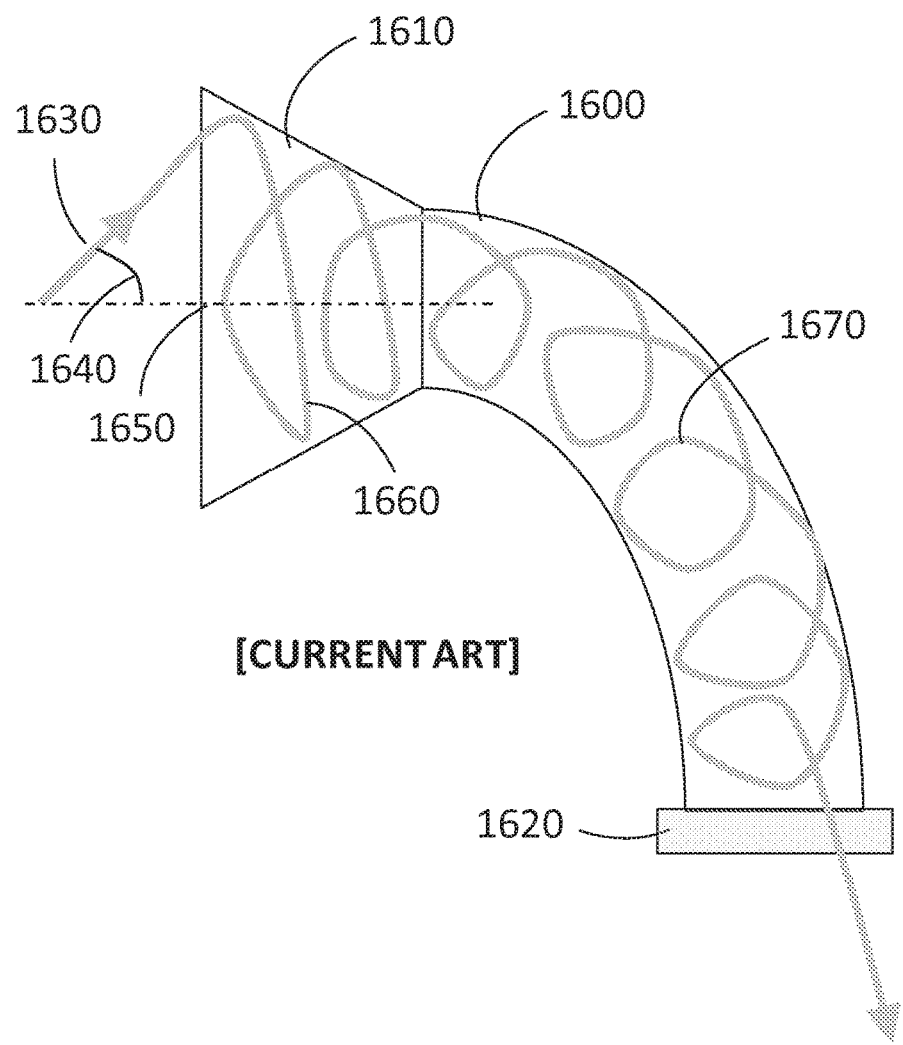
FIG. 16 shows limitations of existing art with a funnel.

FIG. 16 shows the impact of wind vectors on prior art. A wind vector 1630 enters a reducing section 1610 at an angle 1640 measured from the reducing section centerline 1650. A swirling effect 1660 is created as the wind vector changes direction resulting in turbulence as it passes through a tube 1670 and wind turbine 1620, resulting in inefficiencies to the power output.

Figure 17:
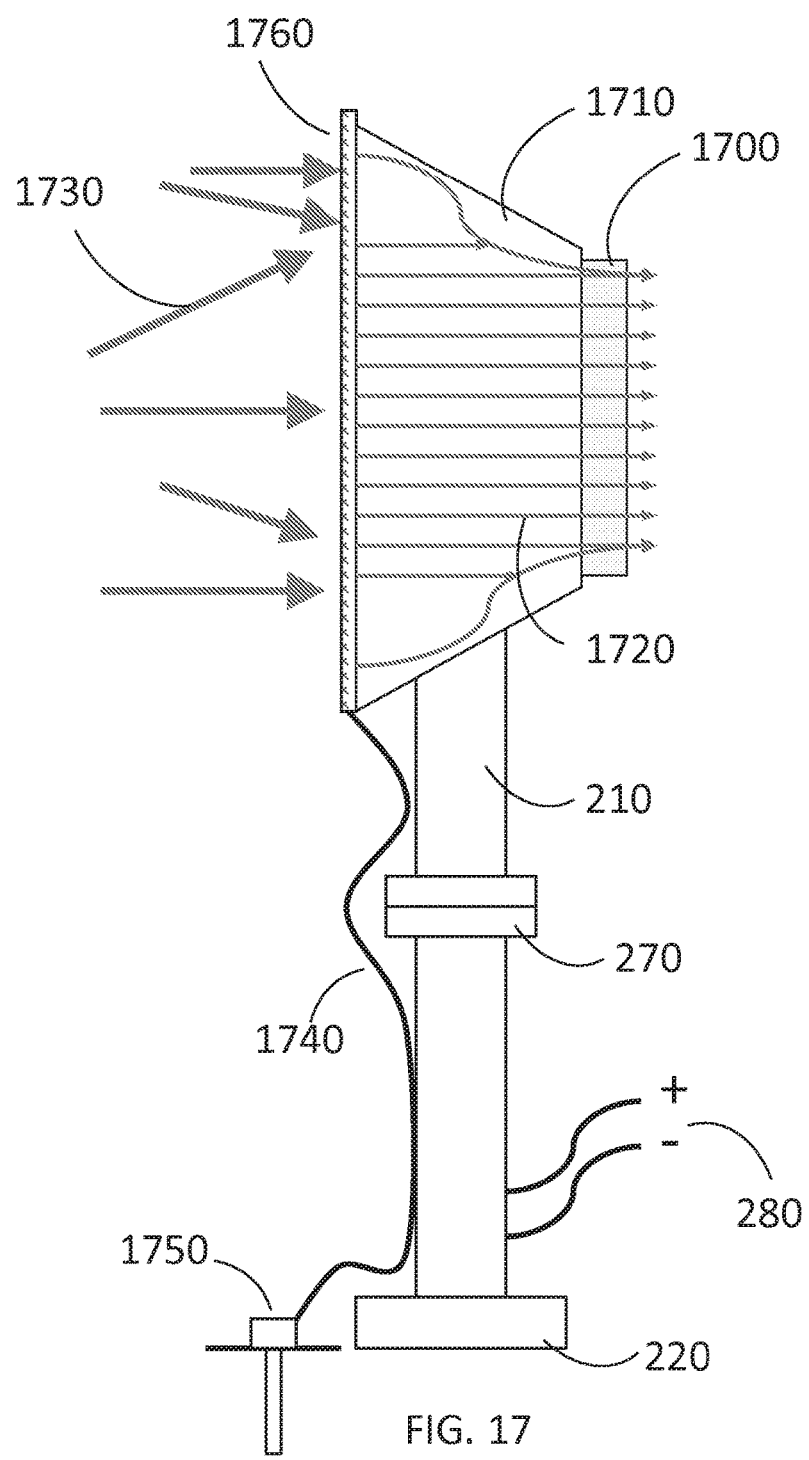
FIG. 17 shows an embodiment with a funnel.

FIG. 17 shows an embodiment with a reducing section. Shown are a wind turbine 1700 placed downwind of a covering screen 1760, a funnel 1710, a turbulent wind flow 1730 striking the screen 1760, and a more laminar wind flow 1720 passing through the funnel 1710. A grounding wire 1740 with a grounding stake 1750 electrically connected to the screen 1760 is also shown configured to protect the wind turbine 1700 from a lighting strike.

Figure 18:
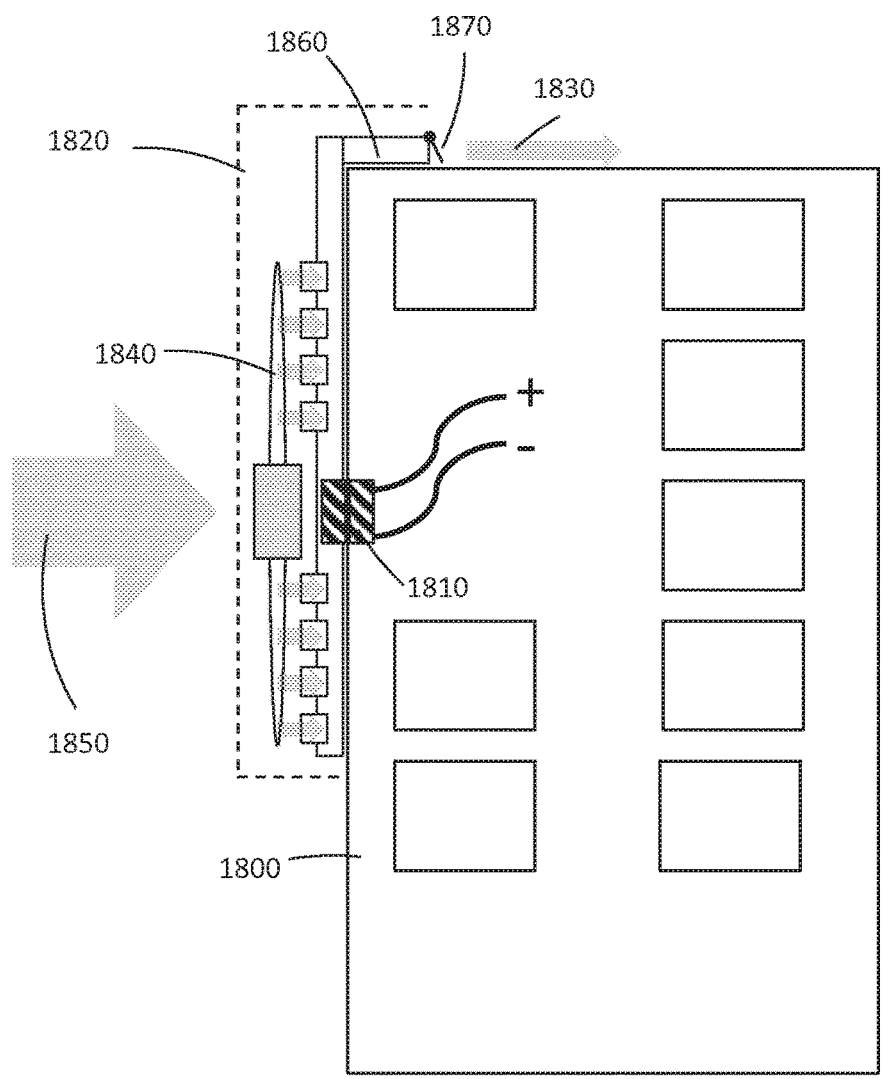
FIG. 18 shows an embodiment with a windward facing rotor.

FIG. 18 shows an embodiment with a windward facing wind turbine. Shown are a structural face 1800 receiving substantial wind 1850, a wireless power transfer 1810 between the wind turbine 1840 and the structural face 1800, a screen 1820 visually masking the wind turbine 1840, the wind turbine 1840 placed substantially on the structural face 1800, ducting 1860 configured to created redirected wind flow 1830 over or around the structural face 1800, and a valve 1870 covering the outlet to prevent the ingestion of debris or wildlife.

Figure 19:
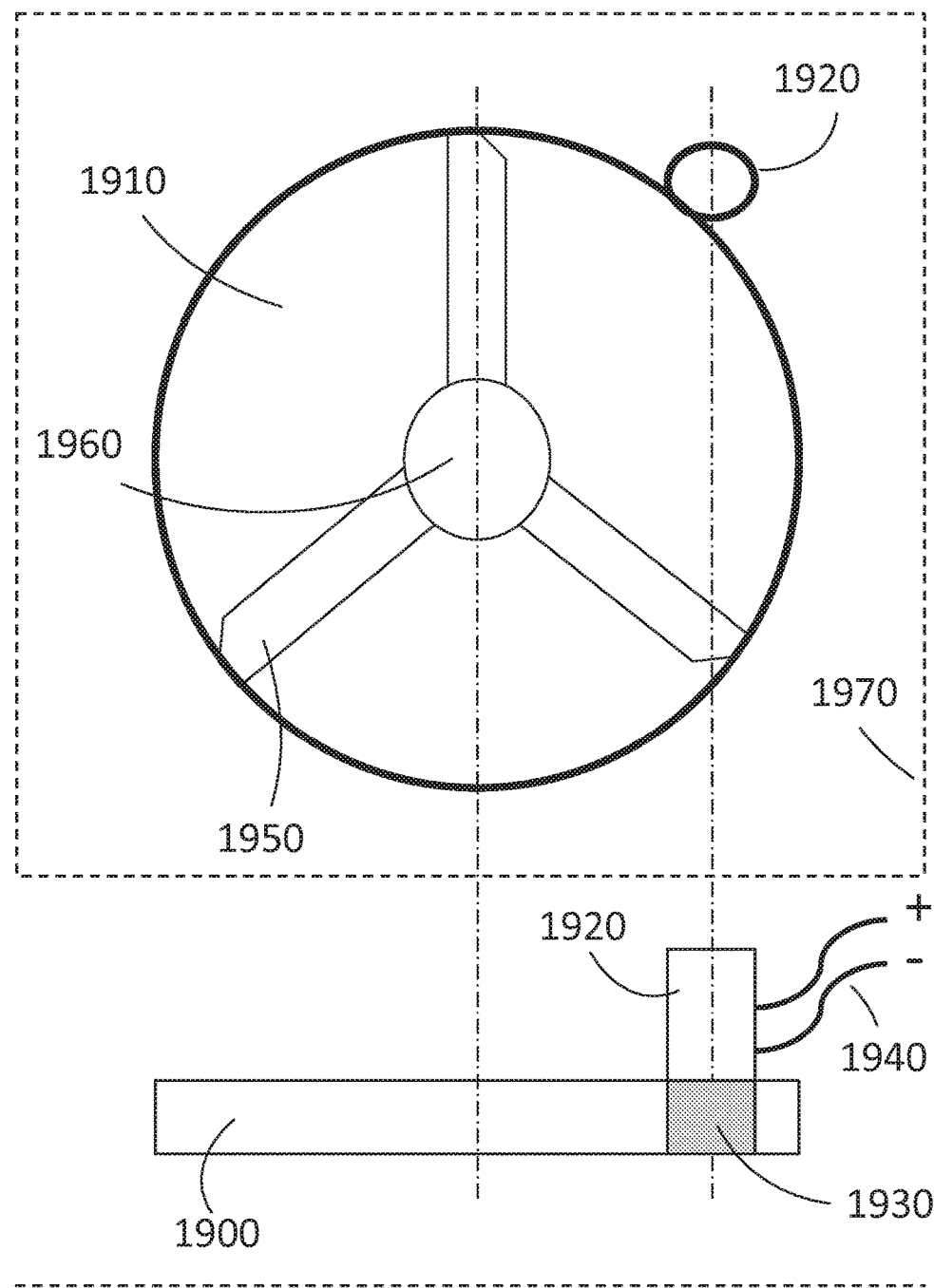
FIG. 19 is a front view of a rotor configuration with an outer race and an off-center motor-generator.

FIG. 19 is a front view of an embodiment with an outer race and off-center motor-generator. Shown are an outer race 1900 connecting the tips of the turbine blades 1950, a rotating power motor-generator 1920, contact surface 1930 between rotating power motor-generator 1920 and the outer race 1900, power 1940 into or out of the rotating power motor-generator 1920, and a central turning axis 1960 of the wind turbine assembly 1910, and a screen 1970 configured to hide, protect, and improve the performance of the apparatus.

Figure 20:
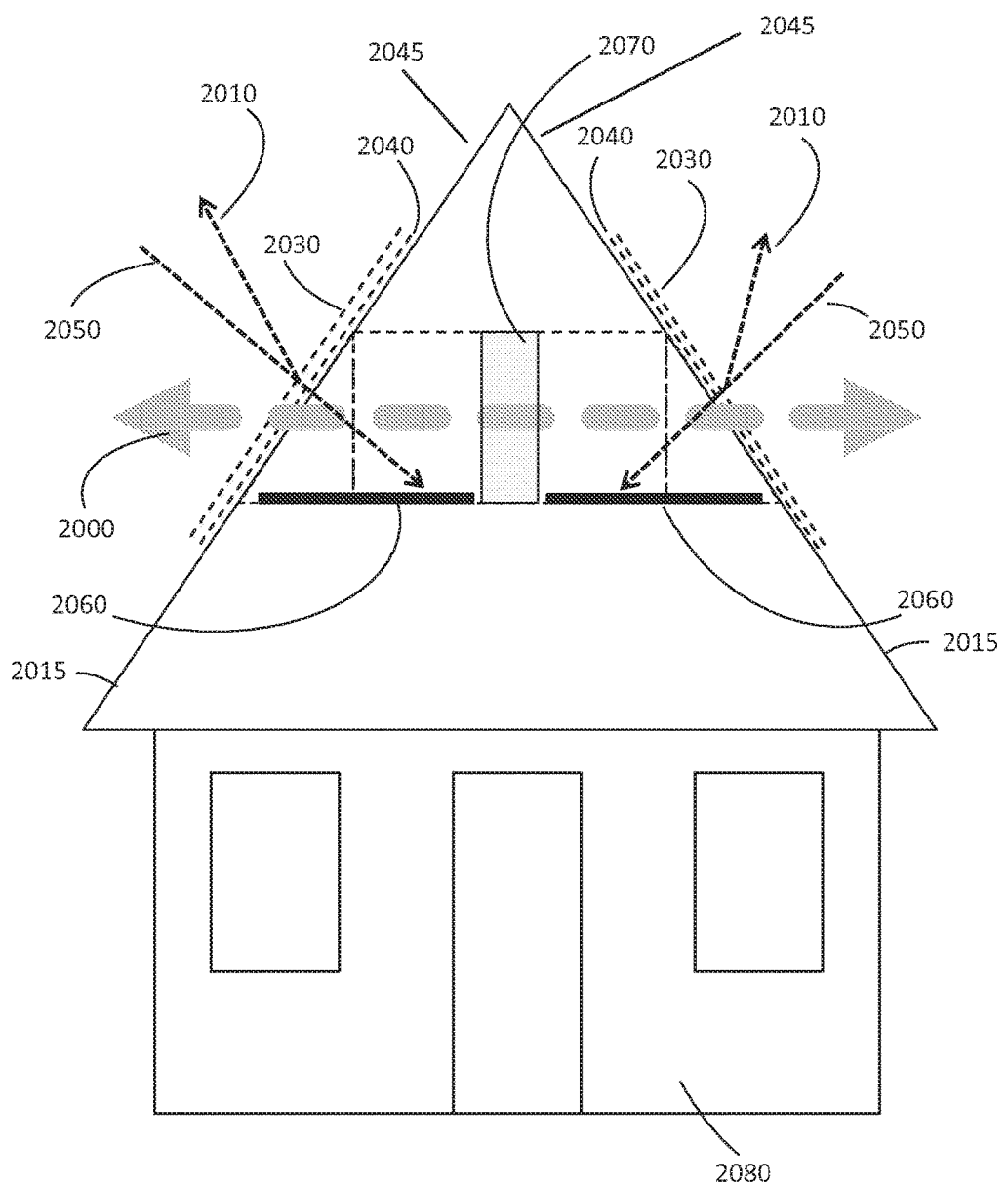
FIG. 20 shows an embodiment mounted between an apex roofline of a house.

FIG. 20 shows an embodiment mounted between an apex roofline of a house. Shown are wind 2000 passing between the apex roofline 2005 in either direction, light photons 2010 reflected off the colored screen surface 2030 blending with the roof surface 2015, screen mesh 2040 covering the entrance into the wind tunnel 2025, light photons 2050 passing through the screen 2035 striking a solar panel 2060 that is placed to absorb light and allow wind 2000 to pass between apexes 2045, a wind turbine 2070 placed to capture wind energy passing between apexes 2045, and a dwelling or municipal structure 2080.

Figure 21:
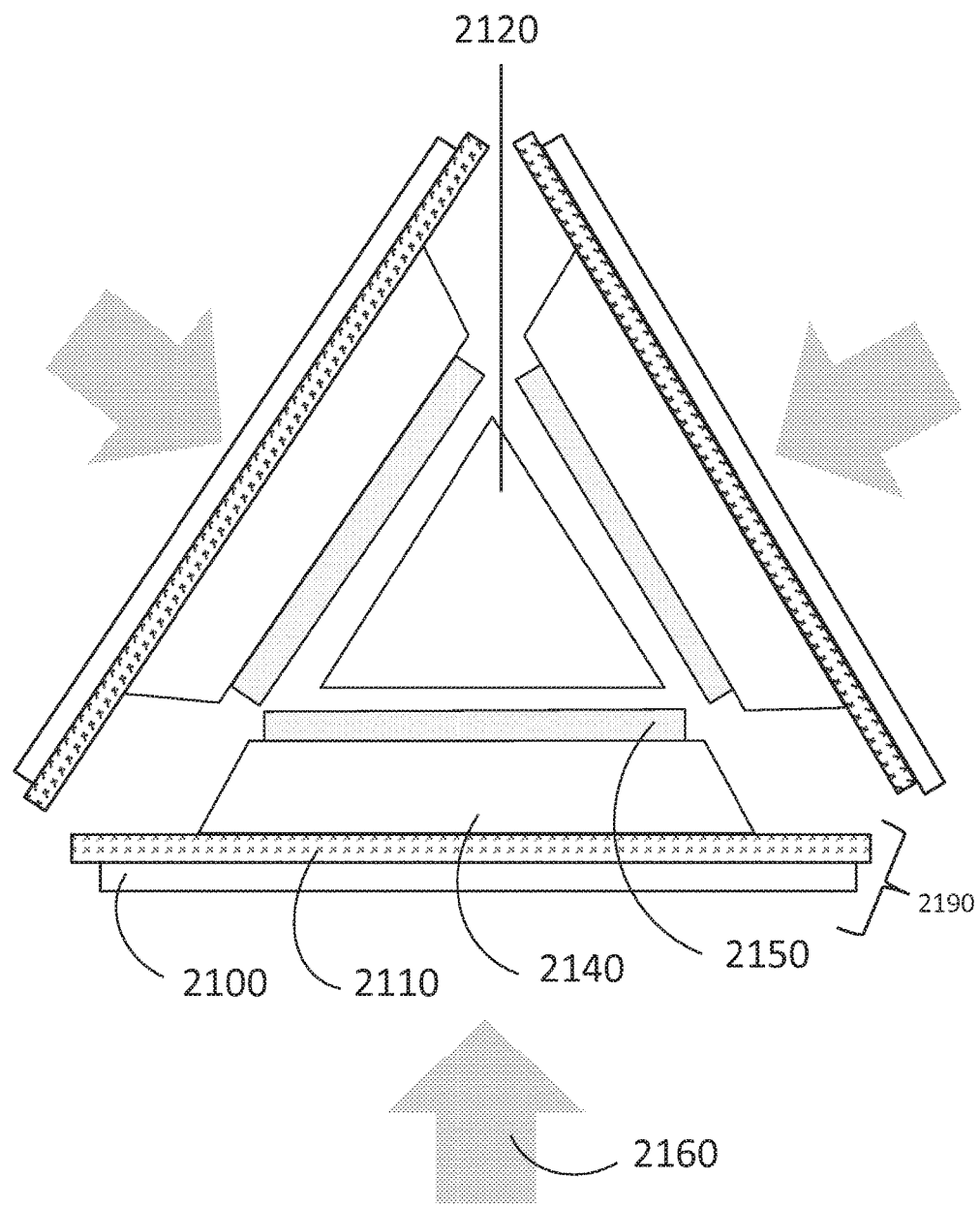
FIG. 21 shows an embodiment with combined masked wind turbines facing multiple directions.

FIG. 21 is a top-view of an embodiment with combined screen covered wind turbines facing multiple directions. Shown are a plurality of maintenance walkways 2100 to service the assembly 2190, screens 2110, a re-directional object 2120, to prevent wind from passing through opposite turbine(s) 2150, and a plurality of funnels 2140 between the screen 2110 and the turbine 2150.

Figure 22:
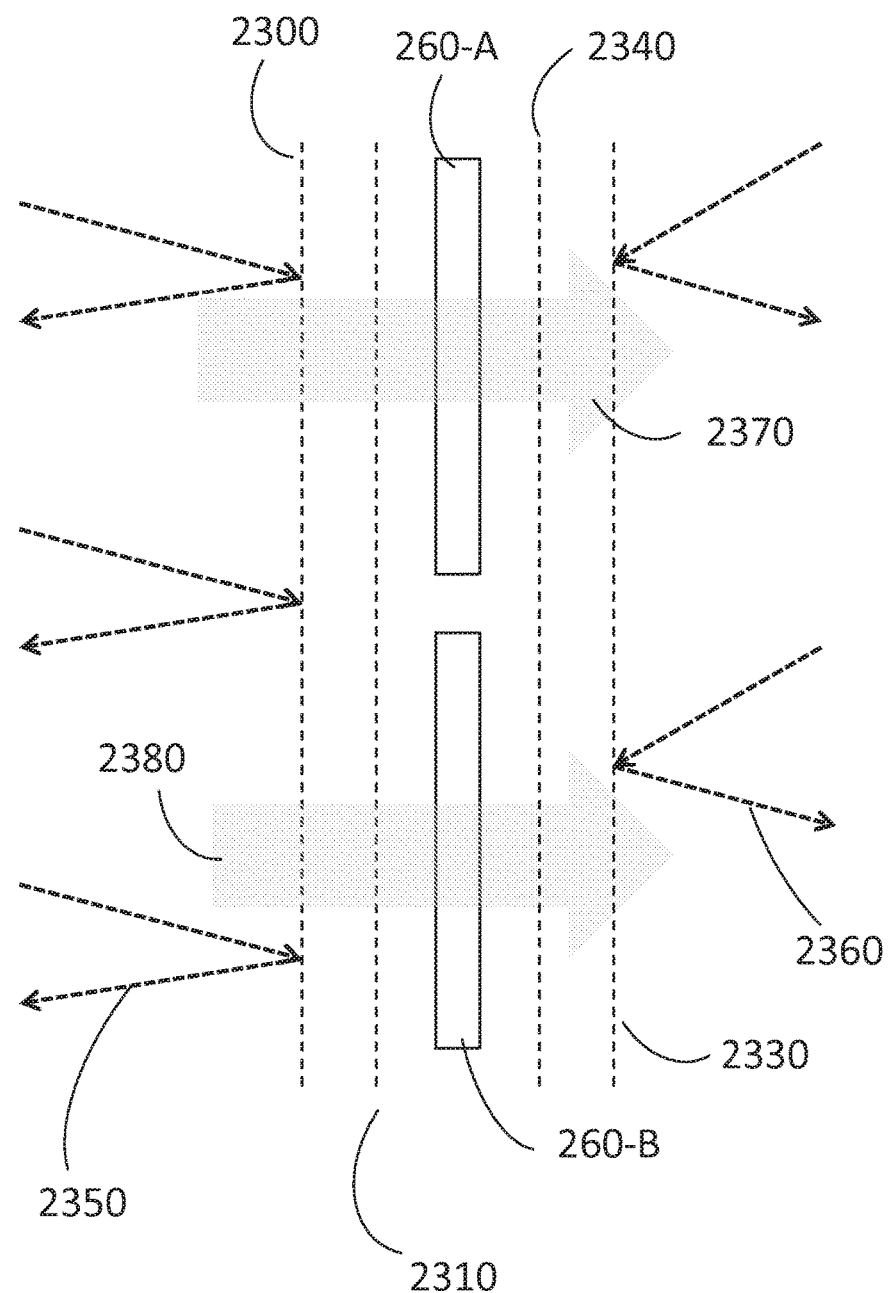
FIG. 22 shows an embodiment with wind turbines masked facing front and back directions.

FIG. 22 is a top-view of an embodiment with wind turbines 260-A and 260-B covered on a side by aerodynamic screen 2310 coated with 2300 reflecting light 2350 and the opposite side by aerodynamic screen 2340 coated with 2330 reflecting light 2360 through which a wind 2370 and 2380 passes.

Figure 23:
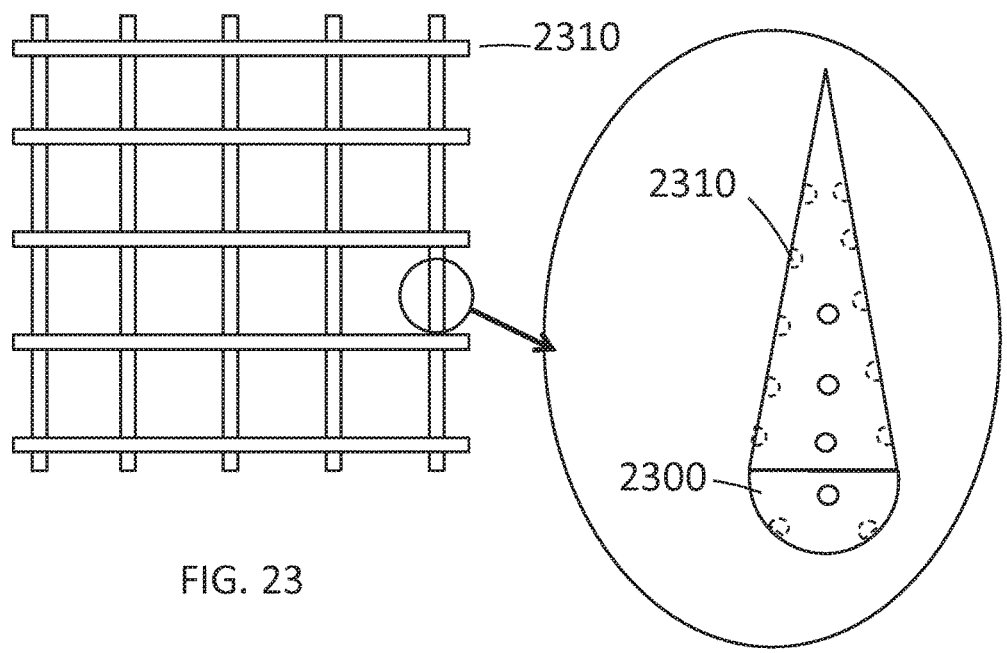
FIG. 23 shows an embodiment with a plurality of surface imperfections on the screen surface.

FIG. 23 shows an embodiment with a plurality of surface protrusions on the screen surface. Shown are an aerodynamic screen cross section 2300 and a plurality of surface shapes 2310 placed on the screen surface to break up immediate surface flow lamination across the screen 2320 and reduce vortex development down-wind of the screen.

Figure 24:
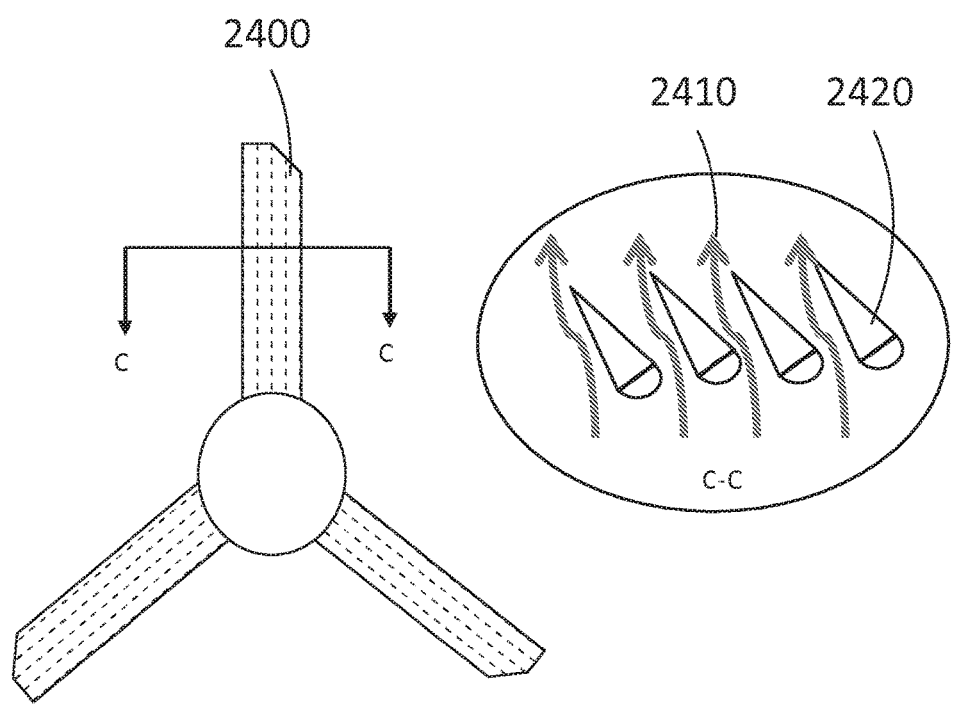
FIG. 24 shows an embodiment of a wind turbine with multi-flow blades.

FIG. 24 shows an embodiment of a wind turbine with multi-flow blades. Shown are a multi-flow wind turbine blade 2400, a split of wind flow 2410 through the multi-flow blade 2400, and an aerodynamic cross-section of the multi-flow blade 2420.

Figure 25:
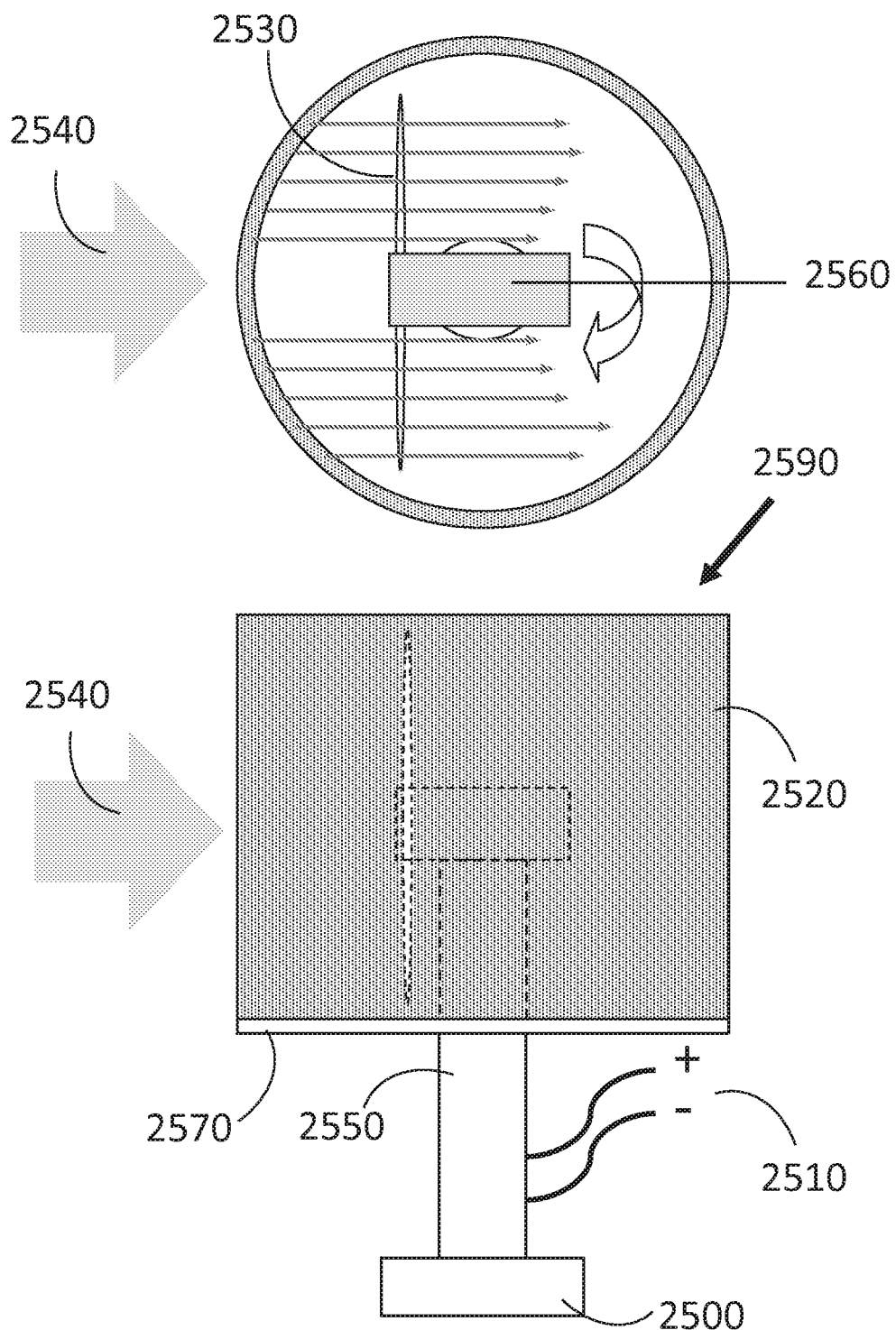
FIG. 25 shows an embodiment with a radial-shaped screen around a horizontal axis wind turbine.

FIG. 25 shows an embodiment with a radial-shaped screen. Shown are a support base 2500, power 2510 into or out of the wind turbine assembly 2590, an aerodynamic, low drag aesthetic cover screen 2520, a wind turbine 2530, wind 2540 directed at the assembly 2590, a support structure 2550, a wind turbine generator 2560 that can rotate about the support structure within the screen 2520, and a connector 2570 between the support structure 2550 and the screen.

Figure 26:
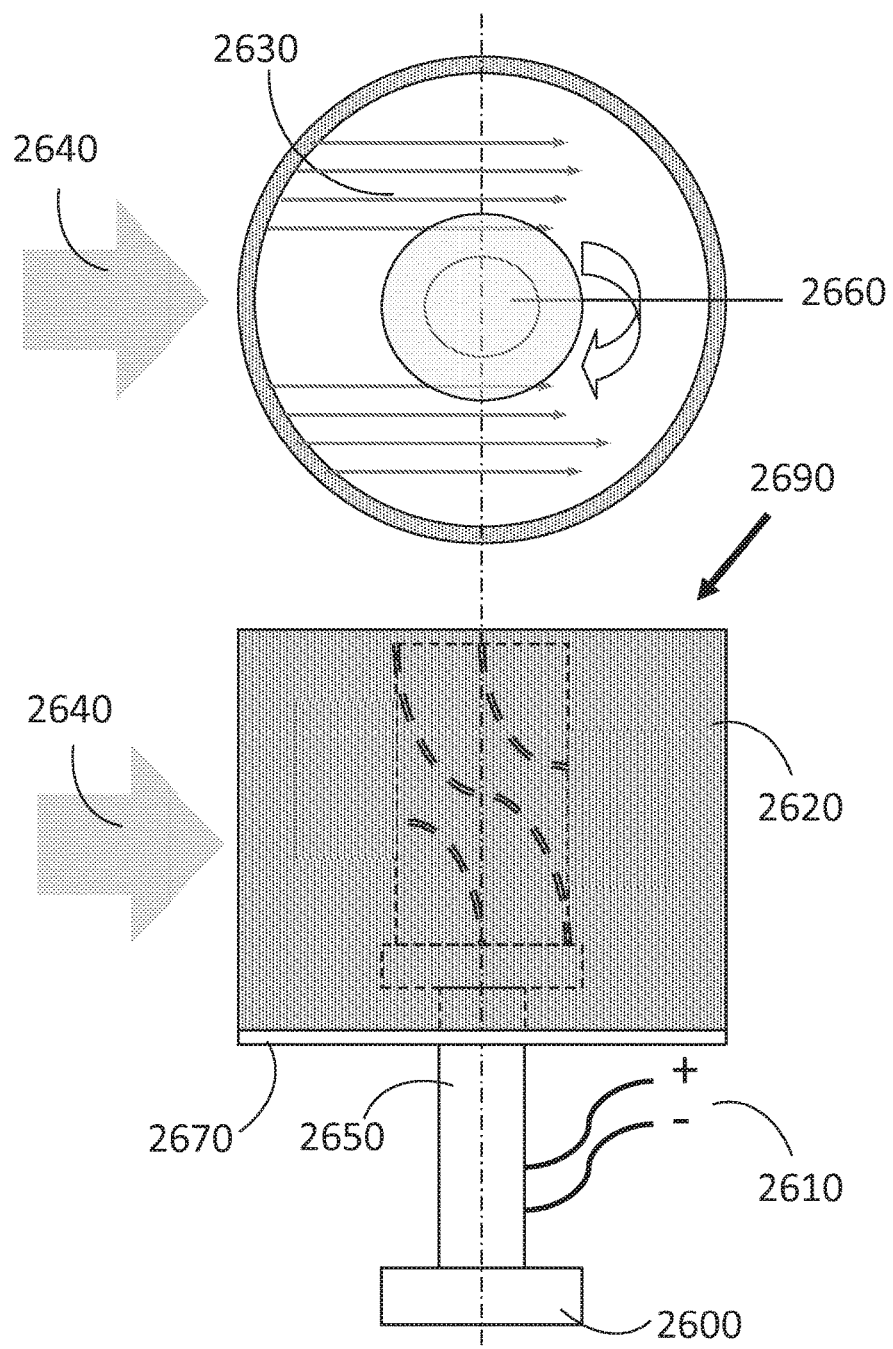
FIG. 26 shows an embodiment with a radial-shaped screen around a vertical axis wind turbine.

FIG. 26 shows an embodiment with a radial-shaped screen. Shown are a support base 2600, power 2610 into or out of the wind turbine assembly 2690, an aerodynamic, low drag aesthetic cover screen 2620, a vertical axis wind turbine 2630, wind 2640 directed at the assembly 2690, a support structure 2650, a wind turbine generator 2660 that can rotate about the support structure within the screen 2620, and a connector 2670 between the support structure 2650 and the screen.

Figure 27:
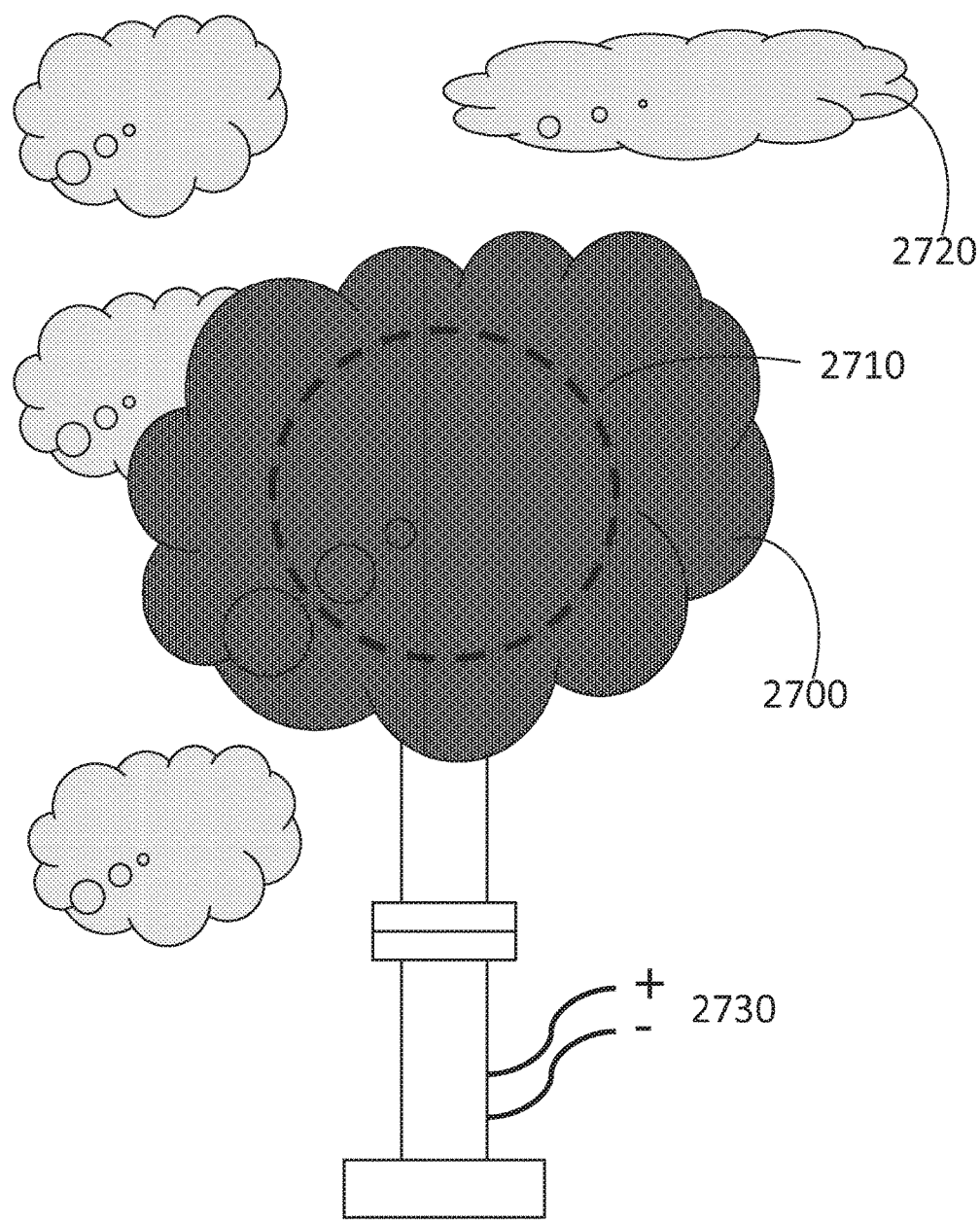
FIG. 27 shows an embodiment configured to match a surrounding environment.

FIG. 27 shown an embodiment configured to match a surrounding environment. Shown is a screen 2700 covering the wind turbine 2710 shaped to blend with nearby forms (environment) 2720 and power 2730 into or out of the wind turbine 2710.

Figure 28:
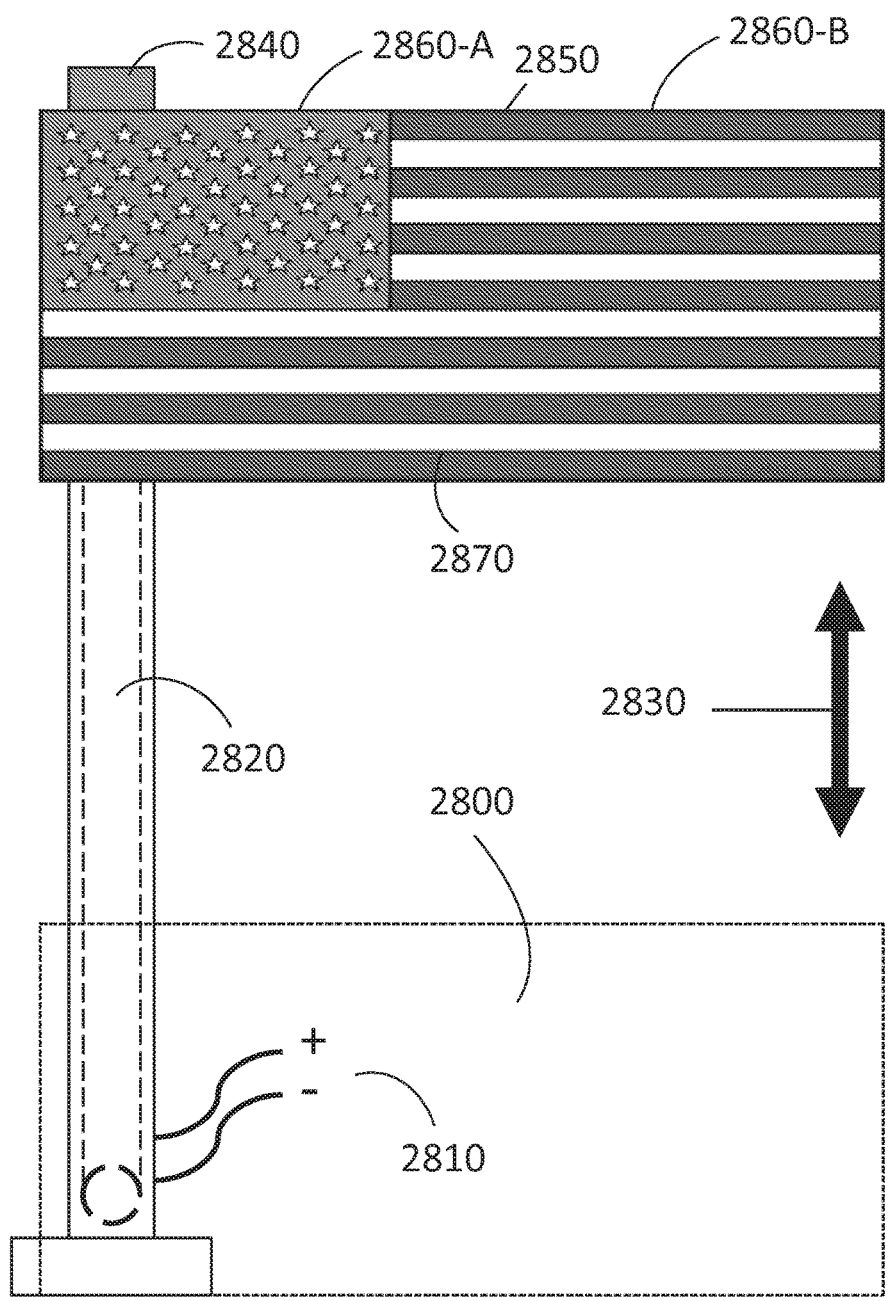
FIG. 28 shows an embodiment configured to match a flag.

FIG. 28 shown an embodiment configured to match a flying flag. Shown is a screen 2850 covering the wind turbines 2860-A and 2860-B coated to appear as an American flag 2870 with power into or out of the wind turbine 2810 including raising and lower mechanism 2820, a power coupling 2840, and a storage box 2800, for lowering the apparatus into seclusion useful during inclement weather conditions and legally mandated periods.

Figure 29:
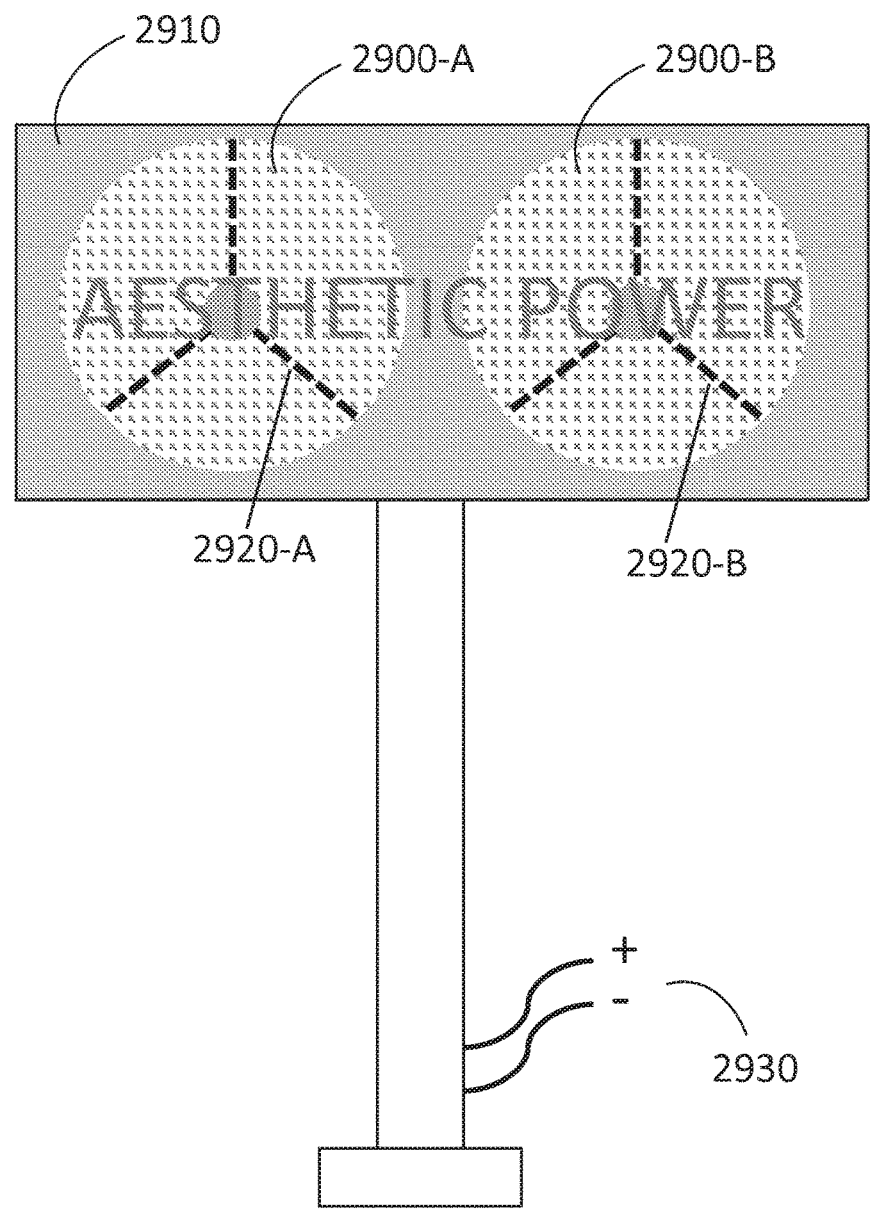
FIG. 29 shows an embodiment configured with a mixed surface partially of solid surface and partially of wind screen.

FIG. 29 shows an embodiment configured with a mixed surface. Shown is a solid surface 2910 with two aerodynamically efficient screens 2900-A and 2900-B covering the wind turbines 2920-A and 2920-B with power into or out of the wind turbine 2930.

Figure 30:
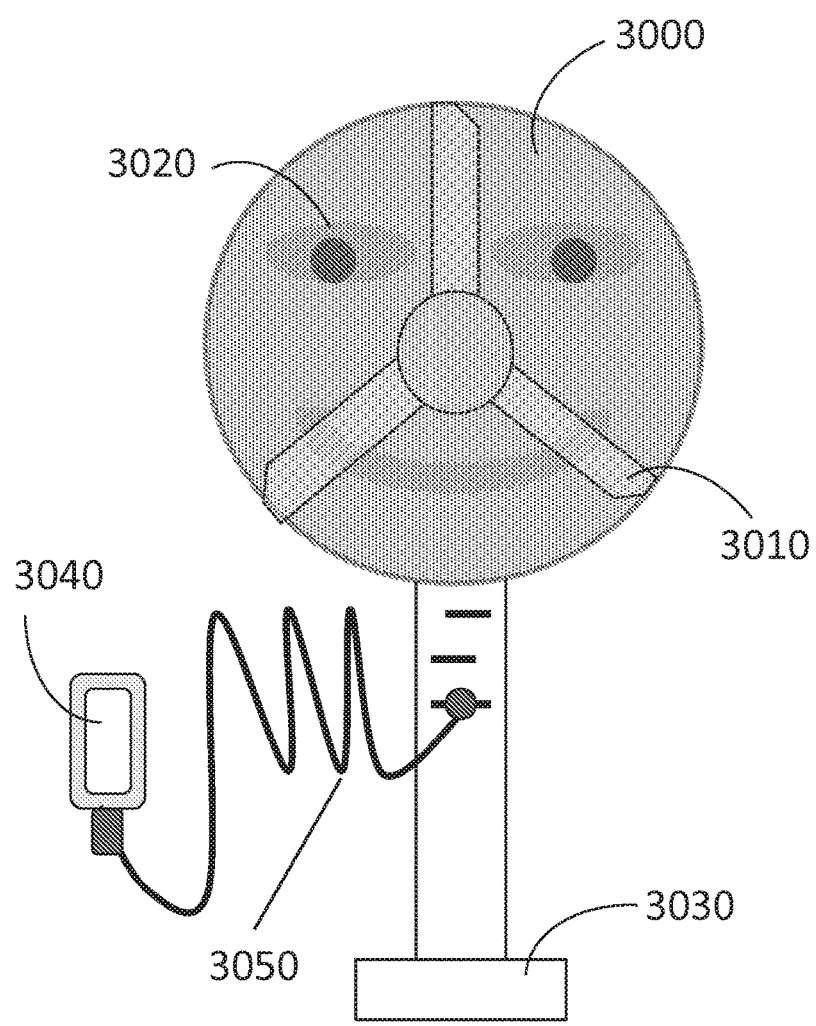
FIG. 30 shows an embodiment of a stand-alone remote device charging station with happy face.

FIG. 30 shows an embodiment configured as a stand-alone charging station. Shown is an aerodynamic screen 3000 covering the wind turbine 3010 coated with an image 3020 with base 3030 and an electrical device 3040 to be charged through power cord 3050.

All patents and publications mentioned in the prior art are indicative of the levels of those skilled in the art to which the invention pertains. All patents and publications are herein incorporated by reference to the same extent as if each individual publication was specifically and individually indicated to be incorporated by reference, to the extent that they do not conflict with this disclosure.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations, and broad equivalent arrangements.

I claim:

1. An aerodynamic screen system comprising:
   a mesh including a network of intersecting screen elements that define a plurality of screen openings there between, the intersecting screen elements including an aerodynamic profile, the aerodynamic profile including a first end that is rounded and a second end that tapers from the first end, wherein the second end includes a resonance tube.

2. The aerodynamic screen system as recited in claim 1, further comprising one or more wind turbines adjacent the mesh.

3. The aerodynamic screen system as recited in claim 1, further comprising a multi-blade rotor rotatable about an axis and a motor-generator connected with the multi-blade rotor, the multi-blade rotor defining a circular rotational profile area centered about the axis, and the mesh including a periphery defining an area that is larger than the circular rotational profile area.

4. The aerodynamic screen system as recited in claim 1, wherein the aerodynamic profile has a drag coefficient in a range of 0.04 to 0.25.

5. The aerodynamic screen system as recited in claim 1, wherein the aerodynamic profile has a teardrop shape.

6. The aerodynamic screen system as recited in claim 1, wherein the first end has a semi-circular profile.

7. The aerodynamic screen system as recited in claim 1, further comprising a light emitting device mounted on the mesh.

8. The aerodynamic screen system as recited in claim 1, further comprising one or more solar panels adjacent the mesh.

9. The aerodynamic screen system as recited in claim 1, further comprising a rotatable support structure upon which the mesh is mounted.

10. The aerodynamic screen system as recited in claim 1, wherein the mesh includes a coating.

11. The aerodynamic screen system as recited in claim 1, wherein the aerodynamic profile defines a depth from the first end to the second end, an inlet size of the screen openings, and an outlet size of the screen openings, and each of the depth, the inlet size, and the outlet size are constant along the mesh.

12. The aerodynamic screen system as recited in claim 1, wherein the aerodynamic profile defines a depth from the first end to the second end, an inlet size of the screen openings, and an outlet size of the screen openings, and at least one of the depth, the inlet size, or the outlet size varies along the mesh.

13. The aerodynamic screen system as recited in claim 12, wherein the at least one of the depth, the inlet size, or the outlet size varies along the mesh with respect to variations in acoustic signature of a blade of a wind turbine.

14. The aerodynamic screen system as recited in claim 1, wherein the aerodynamic profile includes multiple different aerodynamic profiles.

15. The aerodynamic screen system as recited in claim 1, wherein the aerodynamic profile includes multiple aerodynamic profiles that differ in acoustic properties.

16. The aerodynamic screen system as recited in claim 1, further comprising a wind turbine adjacent the mesh, the wind turbine being rotatable about an axis of rotation, and a motor-generator off-center with respect to the axis of rotation.

17. The aerodynamic screen system as recited in claim 1, wherein the aerodynamic profile is elongated along a direction from the first end to the second end.

18. An aerodynamic screen system comprising:
a mesh including a grid of screen elements that define a plurality of screen openings there between, the screen elements including an aerodynamic profile that has a drag coefficient in a range of 0.04 to 0.25, the aerodynamic profile including a first end and a second end wherein the second end includes a resonance tube.

19. The aerodynamic screen system as recited in claim 18, further comprising one or more wind turbines adjacent the mesh.

20. The aerodynamic screen system as recited in claim 18, further comprising a multi-blade rotor rotatable about an axis and a motor-generator connected with the multi-blade rotor, the multi-blade rotor defining a circular rotational profile area centered about the axis, and the mesh including a periphery defining an area that is larger than the circular rotational profile area.

21. The aerodynamic screen system as recited in claim 18, further comprising a light emitting device mounted on the mesh.

22. The aerodynamic screen system as recited in claim 18, further comprising one or more solar panels adjacent the mesh.

23. The aerodynamic screen system as recited in claim 18, further comprising a rotatable support structure upon which the mesh is mounted.

* * * * *